US012670716B2

(12) United States Patent
Patrawala et al.

(10) Patent No.: US 12,670,716 B2
(45) Date of Patent: Jun. 30, 2026

(54) IMAGE PROCESSING METHOD, COMPUTER PROGRAM, AND IMAGE PROCESSING APPARATUS

(71) Applicants: DAIKIN INDUSTRIES, LTD., Osaka (JP); FAIRY DEVICES INC., Tokyo (JP)

(72) Inventors: Viraf Patrawala, Osaka (JP); Anishram Senathi, Osaka (JP); Vansh Bhatia, Osaka (JP)

(73) Assignees: DAIKIN INDUSTRIES, LTD., Osaka (JP); FAIRY DEVICES INC., Tokyo (JP)

( * ) Notice: Subject to any disclaimer, the term of this patent is extended or adjusted under 35 U.S.C. 154(b) by 0 days.

(21) Appl. No.: 18/876,924

(22) PCT Filed: Jun. 21, 2023

(86) PCT No.: PCT/JP2023/022855
§ 371 (c)(1),
(2) Date: Dec. 19, 2024

(87) PCT Pub. No.: WO2023/249034
PCT Pub. Date: Dec. 28, 2023

(65) Prior Publication Data
US 2026/0004584 A1 Jan. 1, 2026

(30) Foreign Application Priority Data

Jun. 23, 2022 (JP) .................................. 2022-101248

(51) Int. Cl.
*G06K 9/00* (2022.01)
*G06V 10/74* (2022.01)
(Continued)

(52) U.S. Cl.
CPC ............ *G06V 20/46* (2022.01); *G06V 10/758* (2022.01); *G06V 10/761* (2022.01); (Continued)

(58) Field of Classification Search
CPC ........ G06V 20/41; G06V 20/46; G06V 20/49; G06V 10/761; G06V 20/10; G06V 20/44; G06V 40/16
See application file for complete search history.

(56) References Cited

U.S. PATENT DOCUMENTS 5,956,026 A * 9/1999 Ratakonda ............. G11B 27/28
715/767
8,989,503 B2 3/2015 Kumar et al.
(Continued)

FOREIGN PATENT DOCUMENTS

CN        112004111 A    11/2020
EP        1 040 429 B1   11/2002
(Continued)

OTHER PUBLICATIONS

European Search Report of corresponding EP Application No. 23 82 7217.3 dated Jun. 25, 2025.
(Continued)

*Primary Examiner* — Hadi Akhavannik
(74) *Attorney, Agent, or Firm* — Spencer Fane LLP

(57) ABSTRACT

An image processing method, by an image processing apparatus, detects candidates of a scene change point in a moving image, detects candidate frames of a main frame of a scene from frames forming the moving image, and determines the main frame from the candidate frames. Based on a time-series order of the candidates of the scene change point and the main frame, when the main frame does not exist between two candidates of the scene change point that are consecutive in time series, the scene change point with
(Continued)

Scene change point    Key frame    Scene change point
Scene one of the two candidates of the scene change point excluded, and when a candidate of the scene change point exists between two main frames that are consecutive in time series and are similar to each other, the scene change point with the candidate of the scene change point excluded.

12 Claims, 15 Drawing Sheets

(51) Int. Cl.

| | |
|---|---|
| *G06V 10/75* | (2022.01) |
| *G06V 10/764* | (2022.01) |
| *G06V 10/82* | (2022.01) |
| *G06V 10/94* | (2022.01) |
| *G06V 20/40* | (2022.01) |

(52) U.S. Cl.
CPC ............ *G06V 10/764* (2022.01); *G06V 10/82* (2022.01); *G06V 10/95* (2022.01); *G06V 20/44* (2022.01)

(56) References Cited

U.S. PATENT DOCUMENTS

| | | |
|---|---|---|
| 2005/0163480 A1 | 7/2005 | Takemoto |
| 2008/0095515 A1 | 4/2008 | Miyamoto |
| 2008/0316307 A1* | 12/2008 | Petersohn .............. G11B 27/28 |
| | | 348/E7.02 |
| 2010/0104261 A1* | 4/2010 | Liu ........................ H04N 5/147 |
| | | 348/576 |
| 2020/0349357 A1 | 11/2020 | Slipenchuk |

FOREIGN PATENT DOCUMENTS

| | | |
|---|---|---|
| EP | 1 942 671 A1 | 7/2008 |
| JP | 10-257436 A | 9/1998 |
| JP | 2001-527304 A | 12/2001 |
| JP | 2003-519946 A | 6/2003 |
| JP | 2005-151069 A | 6/2005 |
| JP | 2008-109290 A | 5/2008 |
| JP | 2021-131738 A | 9/2021 |
| WO | 01/50339 A2 | 7/2001 |
| WO | 2007/039995 A1 | 4/2007 |

OTHER PUBLICATIONS

International Search Report of corresponding PCT Application No. PCT/JP2023/022855 dated Aug. 1, 2023.

International Preliminary Report of corresponding PCT Application No. PCT/JP2023/022855 dated Aug. 1, 2023.

Liang et al.; News Video Summarization Combining SURF and Color Histogram Features; Entropy, vol. 23, No. 8, Jul. 1 2002, p. 982, ISSN: 1099-4300; URL:https://www.mdpi.com/1099-4300/23/8/982/pdf.

Examination Report of corresponding Indian Application No. 202417103248 dated Feb. 10, 2026.

* cited by examiner

Scene change point     Key frame     Scene change point

Scene

Edge image

Frame image

Candidate frame 2

Candidate frame 1

Candidate frame 2

Candidate frame 1

IMAGE PROCESSING METHOD, COMPUTER PROGRAM, AND IMAGE PROCESSING APPARATUS

CROSS-REFERENCE TO RELATED APPLICATIONS

This application is the national phase under 35 U.S.C. § 371 of PCT International Application No. PCT/JP2023/022855 which has an International filing date of Jun. 21, 2023 and designated the United States of America.

BACKGROUND

Technical Field

The present invention relates to an image processing method, a computer program, and an image processing apparatus for executing image processing on a moving image.

Background information

Image processing techniques for detecting a change in a scene (a shot or the like) in a moving image have been widely used. With such techniques, for example, for a plurality of frames forming a moving image, comparison in pixel value is performed between frames consecutive in time series, and whether there is a change in a scene is determined based on a result of the comparison. In addition, in recent years, a method of using a learning model for which machine learning has been performed in advance to detect a change in scene has also been developed.

Japanese Unexamined Patent Application Publication (Translation of PCT Application) No. 2003-519946 proposes a method of detecting a scene change in a video, counting the number of changes in consecutive scenes to detect a scene involving a fast movement, and selecting a key frame from the scene.

SUMMARY

An image processing method according to a first aspect includes, by an image processing apparatus, detecting candidates of a scene change point in a moving image, detecting candidate frames that are candidates of a main frame of a scene from among frames forming the moving image, determining the main frame from among the candidate frames, and determining the scene change point from among the candidates of the scene change point based on a time-series order of the candidates of the scene change point and the main frame.

DETAILED DESCRIPTION OF EMBODIMENT(S)

Specific examples of an information processing system according to embodiments of the present invention will be described below with reference to the drawings. Note that the present invention is not limited to these examples, but is indicated by the scope of the claims, and is intended to include all modifications within the meaning and scope equivalent to the scope of the claims.

System Configuration

Figure 1:
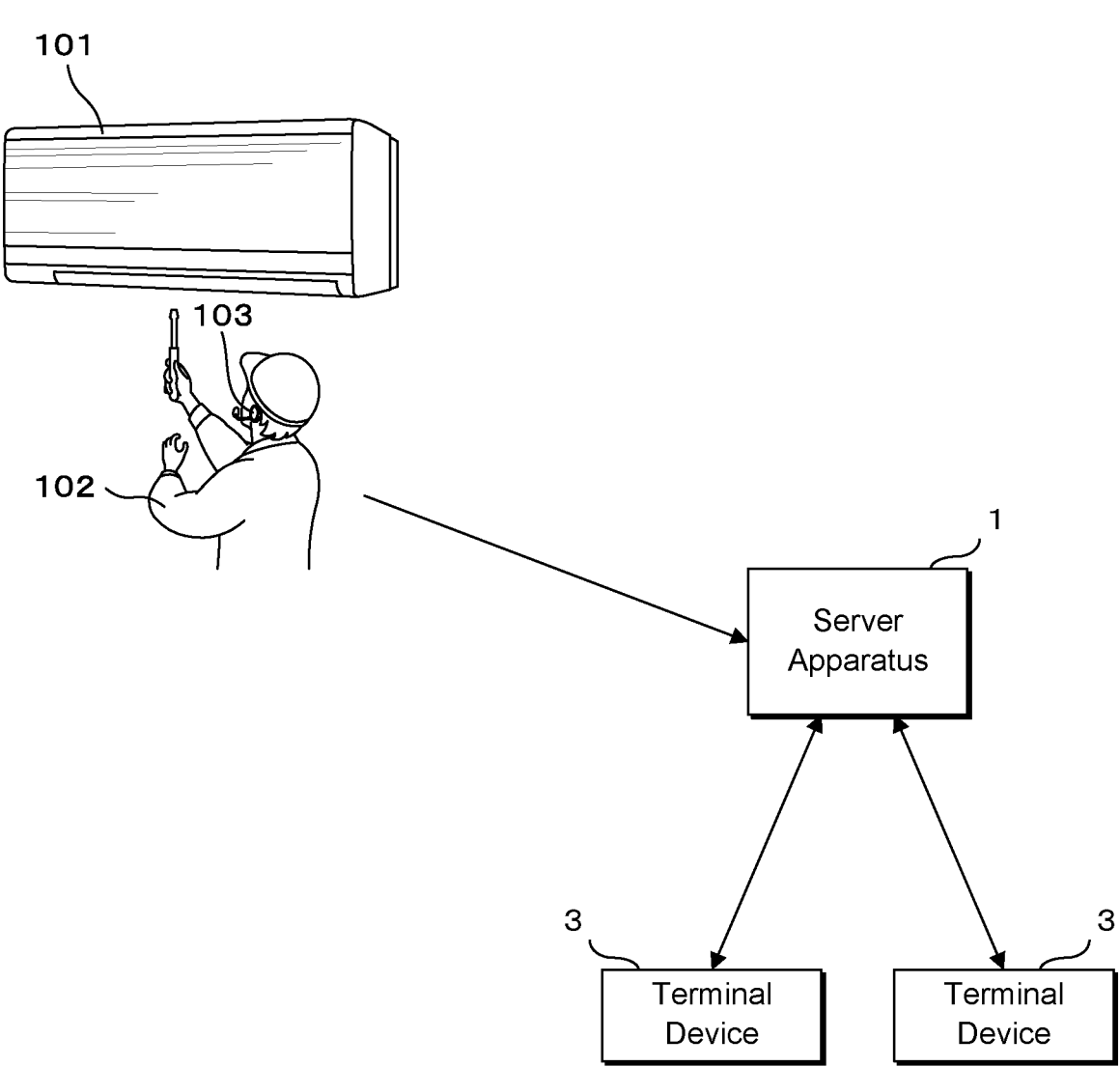
FIG. 1 is a schematic view for explaining an overview of an information processing system according to the present embodiment.

FIG. 1 is a schematic view for explaining an overview of an information processing system according to the present embodiment. In the information processing system according to the present embodiment, a worker 102 who performs work such as installation or repair for an air conditioner unit 101 captures an image of the work he or she is performing, using a camera 103 provided in a headset or the like worn on the head of the worker. In the present embodiment, it is assumed that the image is captured by using the camera 103 provided to a wearable device such as a headset worn by the worker 102. However, the present disclosure is not limited thereto, and the image of the work may be captured using the camera 103 provided around the air conditioner unit 101 and the worker 102. Further, the air conditioner unit 101 illustrated FIG. 1 is an indoor unit of an air conditioner, but is not limited thereto, and the air conditioner unit 101 may be various air-conditioning-related devices such as an outdoor unit of an air conditioner, a ventilation device, a circulator, an air purifier, a heating appliance, or a dehumidification dryer for example. Further, the camera 103 may capture an image of work such as installation or repair of various devices other than the air-conditioning-related devices, and may capture an image of various types of work other than installation, repair, or the like of these devices.

A moving image captured by the camera 103 is provided to a server apparatus 1. The server apparatus 1 acquires the moving images captured by one or a plurality of workers and accumulates the acquired moving images in a database. As a method of providing the moving image from the camera 103 to the server apparatus 1, for example, when the camera 103 has a communication function, a method of directly transmitting the moving image from the camera 103 to the server apparatus 1 by wired or wireless communication can be adopted. When the camera 103 does not have the communication function, for example, the camera 103 can record a moving image in a recording medium such as a memory card or an optical disc, and the camera 103 can provide the moving image to the server apparatus 1 via the recording medium. Further, for example, a terminal device such as a personal computer (PC) or a smartphone may be interposed between the camera 103 and the server apparatus 1, and the terminal device may acquire a moving image from the camera 103 and transmit the moving image to the server apparatus 1. Any method may be adopted as a method of providing a moving image from the camera 103 to the server apparatus 1.

The server apparatus 1 can communicate with one or a plurality of terminal devices 3 via a network such as a local area network (LAN) or the Internet. The terminal device 3 is, for example, a general-purpose information processing apparatus such as a PC or a smartphone, and in the present embodiment, for example, is used by an unskilled user who learns work such as installation or repair for the air conditioner unit 101 to watch a moving image obtained by capturing the work performed by a skilled worker. Based on a request from the terminal device 3, the server apparatus 1 acquires a desired moving image from a plurality of moving images stored in the database and transmits the desired moving image to the terminal device 3. The terminal device 3 displays (plays) the moving image received from the server apparatus 1.

The server apparatus 1 according to the present embodiment detects a scene (a shot or the like) and a key frame (a main frame) in a moving image acquired from the camera 103, and stores information on these detection results in a database together with the moving image. The moving image captured by the camera 103 includes about several tens of consecutive frames (still images) per second, and a key frame is a frame with important information on a scene among the plurality of frames. The server apparatus 1 transmits information on the scene and the key frame to the terminal device 3 together with the moving image. The terminal device 3 can receive the information on the scene and the key frame together with the moving image from the server apparatus 1, receive selection of the scene or the key frame from a user when playing the moving image, for example, and start playing the moving image from the scene or the key frame selected.

The server apparatus 1 according to the present embodiment first executes processing of detecting a candidate of a scene change point in a moving image captured by the camera 103. In addition, the server apparatus 1 executes processing of detecting a candidate frame that can be the key frame in the moving image captured by the camera 103. Next, the server apparatus 1 executes processing of determining the key frame by excluding, for example, a similar candidate frame from a plurality of candidate frames detected in the moving image. Next, the server apparatus 1 executes processing of determining a scene change point in the moving image based on, for example, whether the key frame exists between two consecutive scene-change-point candidates among a plurality of scene-change-point candidates detected in the moving image. By detecting the scene change point and the key frame in the moving image through these procedures, the server apparatus 1 can be expected to accurately detect the scene change point and the key frame suitable for the moving image.

Apparatus Configuration

Figure 2:
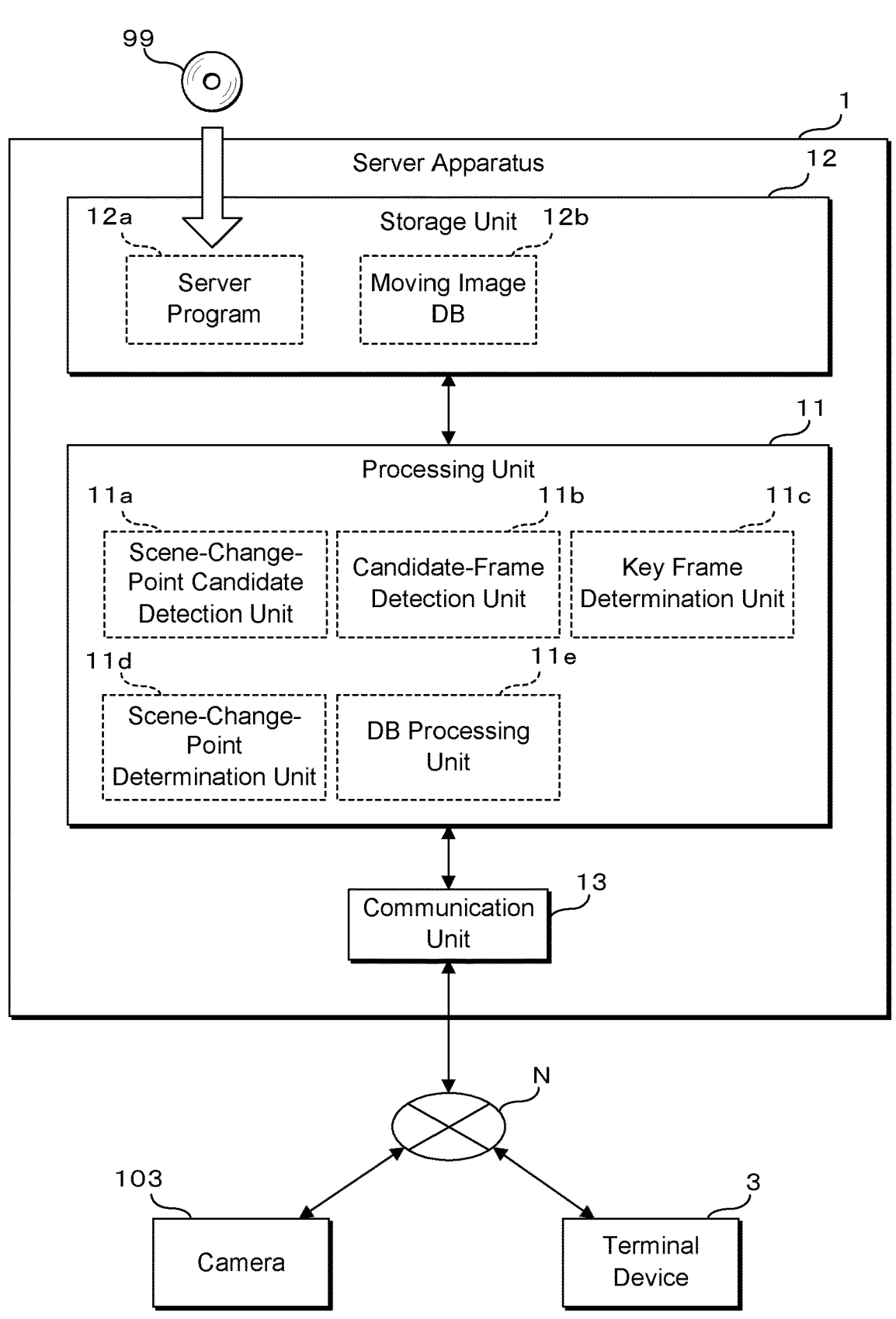
FIG. 2 is a block diagram illustrating a configuration of a server apparatus according to the present embodiment.

FIG. 2 is a block diagram illustrating a configuration of the server apparatus 1 according to the present embodiment. The server apparatus 1 according to the present embodiment includes a processing unit 11, a storage unit (storage) 12, a communication unit (transceiver) 13, and the like. In the present embodiment, it is assumed that the processing is executed by a single server apparatus, but the processing may be executed by a plurality of server apparatuses in a distributed manner.

The processing unit 11 is configured using a calculation processing device such as a central processing unit (CPU), a micro-processing unit (MPU), a graphics processing unit (GPU), or a quantum processor, a read only memory (ROM), a random access memory (RAM), and the like. By reading and executing a server program 12*a* stored in the storage unit 12, the processing unit 11 executes various types of processing such as the processing of detecting a scene change point and a key frame in a moving image captured by the camera 103 and the processing of providing a moving image stored in a database to the terminal device 3.

The storage unit 12 is configured using, for example, a large-capacity storage device such as a hard disk. The storage unit 12 stores various programs to be executed by the processing unit 11 and various types of data necessary for processing by the processing unit 11. In the present embodiment, the storage unit 12 stores the server program 12*a* executed by the processing unit 11. In addition, the storage unit 12 is provided with a moving image database (DB) 12*b* in which moving images captured by the camera 103 are accumulated.

In the present embodiment, the server program (program product) 12*a* is provided in a form recorded in a recording medium 99 such as a memory card or an optical disc, and the server apparatus 1 reads the server program 12*a* from the recording medium 99 and stores the program in the storage unit 12. Alternatively, the server program 12*a* may be written in the storage unit 12 at the manufacturing stage of the server apparatus 1, for example. Further, for example, the server program 12*a* distributed by another server apparatus at a remote location or the like may be acquired by the server apparatus 1 through communication. For example, a writing device may read the server program 12*a* recorded in the recording medium 99 and write the program in the storage unit 12 of the server apparatus 1. The server program 12*a* may be provided in a form of distribution via a network, or may be provided in a form recorded in the recording medium 99.

The moving image DB 12*b* is a database that stores and accumulates moving images captured by the camera 103. In addition, the moving image DB 12*b* stores information on the scene change point and the key frame detected in the moving image in association with these moving images.

The communication unit 13 communicates with various devices via a network N including a mobile phone communication network, a wireless local area network (LAN), the Internet, and the like. In the present embodiment, the communication unit 13 communicates with one or a plurality of terminal devices 3 and the camera 103 via the network N. The communication unit 13 transmits data provided from the processing unit 11 to another device, and provides data received from another device to the processing unit 11.

Note that the storage unit 12 may be an external storage device connected to the server apparatus 1. The server apparatus 1 may be a multi-computer including a plurality of computers, or may be a virtual machine virtually constructed by software. The server apparatus 1 is not limited to the above-described configuration, and may include, for example, a reading unit that reads information stored in a portable storage medium, an input unit that receives an operation input, a display unit that displays an image, and the like.

In addition, in the server apparatus 1 according to the present embodiment, the processing unit 11 reads and executes the server program 12a stored in the storage unit 12, and thus a scene-change-point candidate detection unit 11a, a candidate-frame detection unit 11b, a key frame determination unit 11c, a scene-change-point determination unit 11d, a DB processing unit 11e, and the like are realized as software functional parts in the processing unit 11. In the figure, functional parts related to a moving image are illustrated as the functional parts of the processing unit 11, and functional parts related to other processes are not illustrated.

The scene-change-point candidate detection unit 11a executes processing of detecting a candidate of a point at which a scene (a shot or the like) changes in a moving image captured by the camera 103. The scene-change-point candidate detection unit 11a compares two frames that are consecutive in time series for each frame forming the moving image, and calculates a value indicating a difference between the two frames. When the calculated value exceeds a predetermined threshold, the scene-change-point candidate detection unit 11a determines that a scene change has occurred in the moving image, sets the first frame of the two frames as the end of the scene, and sets the second frame as the start of the next scene. The scene-change-point candidate detection unit 11a sets the point of the first (or last) frame of the scene as a candidate of the scene change point of the moving image, and stores information indicating this point (the time, the number of frames, or the like from the start of the moving image to this point).

Further, in the present embodiment, the scene-change-point candidate detection unit 11a calculates two types of values as the value indicating the difference between the two frames. The first value that indicates the difference between two frames is the "Bhattacharyya Distance". The Bhattacharyya distance is one of measures for obtaining a distance between two probability distributions. The scene-change-point candidate detection unit 11a generates for each of two frames to be compared, a hue, saturation, and luminance (HSL) histogram for a plurality of pixel values included in the frame. From the two HSL histograms generated for the two frames, the scene-change-point candidate detection unit 11a calculates the Bhattacharyya distance indicating the difference between the two histograms. When the calculated Bhattacharyya distance exceeds a predetermined threshold, the scene-change-point candidate detection unit 11a can set the points of the two frames as candidates of the scene change point.

The second value indicating the difference between the two frames is the "Perceptual Hash (pHash) distance". A hash value is a value of a predetermined length (for example, 64 bits, 256 bits, or the like) calculated by executing predetermined calculation processing on input information, and pHash is a hash value with a feature of the input image. The scene-change-point candidate detection unit 11a calculates pHash from each of the two frames, and calculates a distance (for example, Hamming distance) between the two calculated pHash values. The scene-change-point candidate detection unit 11a can set the points of the two frames as candidates of the scene change point when the calculated pHash distance exceeds a predetermined threshold.

The scene-change-point candidate detection unit 11a can perform detection of scene-change-point candidates based on the Bhattacharyya distance and detection of scene-change-point candidates based on the pHash distance, and can use scene-change-point candidates detected as scene-change-point candidates by at least one of the methods as final scene-change-point candidates. Note that the scene-change-point candidate detection unit 11a may use a scene-change-point candidate detected as a scene-change-point candidate by both methods, as a final scene-change-point candidate. Further, the scene-change-point candidate detection unit 11a may perform only one of the detection of the candidates of the scene change points based on the Bhattacharyya distance and the detection of the scene-change-point candidates based on the pHash distance, or may detect the scene-change-point candidates by a method other than these two methods. Further, the scene-change-point candidate detection unit 11a may calculate an average value, a total value, or the like of the calculated Bhattacharyya distances and pHash distances as a degree of difference, and may set the points of the two frames as the scene-change-point candidates when the calculated degree of difference exceeds a threshold.

The candidate-frame detection unit 11b executes processing of detecting a candidate frame that can be a key frame in a moving image captured by the camera 103. The candidate-frame detection unit 11b executes processing of extracting an edge for each frame forming a moving image, compares edges of two frames consecutive in time series, and calculates a change rate between the edges of the two frames. If the calculated edge change rate is lower than a predetermined threshold (i.e., when the change in edge is small), the candidate-frame detection unit 11b sets the earlier one (or later one) of the two frames in time series as a candidate frame that can be a key frame.

The key frame determination unit 11c executes processing of determining the key frame of the moving image from the candidate frames detected by the candidate-frame detection unit 11b. The key frame determination unit 11c extracts feature amounts for a plurality of candidate frames detected in the moving image, and searches for similar candidate frames in the plurality of candidate frames through comparison in feature amounts. The key frame determination unit 11c excludes candidate frames other than any one of the plurality of similar candidate frames, so that the one candidate frame remains as the final key frame. For example, when there are two similar candidate frames, the key frame determination unit 11c can exclude the later one of the candidate frames in time series, so that the earlier one remains. For example, when there are three similar candidate frames, the key frame determination unit 11c may exclude the first and the third ones of the candidate frames in time series, so that the second one remains.

Further, in the present embodiment, the key frame determination unit 11c performs extraction of key point based on Oriented FAST and Rotated BRIEF (ORB) as the extraction of the feature amount in each candidate frame. The key frame determination unit 11c may, for example, perform matching between key points extracted in two candidate frames, calculate a value such as the number or percentage of key points that match between the two candidate frames, and determine whether the two candidate frames are similar based on whether this value exceeds a threshold. Note that the key frame determination unit 11c may determine whether or not the candidate frames are similar by extracting a feature amount other than the key frame based on ORB.

The scene-change-point determination unit 11d executes processing of determining a final scene change point from among the scene-change-point candidates detected by the scene-change-point candidate detection unit 11a, based on the key frame determined by the key frame determination unit 11c. The scene-change-point determination unit 11d checks the relationship, regarding the time-series order, between the scene-change-point candidates and the key frame, and determines whether or not the key frame exists between two scene-change-point candidates one of which is earlier and the other one of which is later in time series. In the present embodiment, this is performed under a condition that at least one key frame is included in the scene determined based on the scene change point (that is, the scene captured in the moving image during the time from the previous scene change point to the subsequent scene change point). When there is no key frame between two consecutive scene-change-point candidates, the scene-change-point determination unit 11d determines that at least one of the scene-change-point candidates is not appropriate, and excludes the scene-change-point candidate. The scene-change-point determination unit 11d repeatedly executes the above-described processing for all the scene-change-point candidates detected in the moving image, excludes inappropriate candidates, and determines the finally remaining scene-change-point candidate as the final scene change point.

Alternatively, the scene-change-point determination unit 11d may determine the scene-change-point candidate detected by the scene-change-point candidate detection unit 11a as the final scene change point. In this case, when there is no key frame between the two scene change points, the scene-change-point determination unit 11d excludes the moving image (that is, the scene) between the two scene change points from the entire moving image. Note that the exclusion of a scene may be performed by, for example, removing data of the scene from data of a moving image to generate data of a moving image with a shortened running time, or may be performed by, for example, removing information on the corresponding scene from scene configuration information held for the moving image without changing the data of the moving image itself.

The DB processing unit 11e stores the moving image captured by the camera 103 in the moving image DB 12b of the storage unit 12 in association with the information on the scene change point determined by the scene-change-point determination unit 11d and the key frame determined by the key frame determination unit 11c for the moving image. In addition, the DB processing unit 11e receives a play request for a moving image from the terminal device 3, reads data of the moving image requested to be played from the moving image DB 12b, and transmits the read moving image and the information on the scene change point and the key frame associated with the moving image to the terminal device 3 that has transmitted the request.

Figure 3:
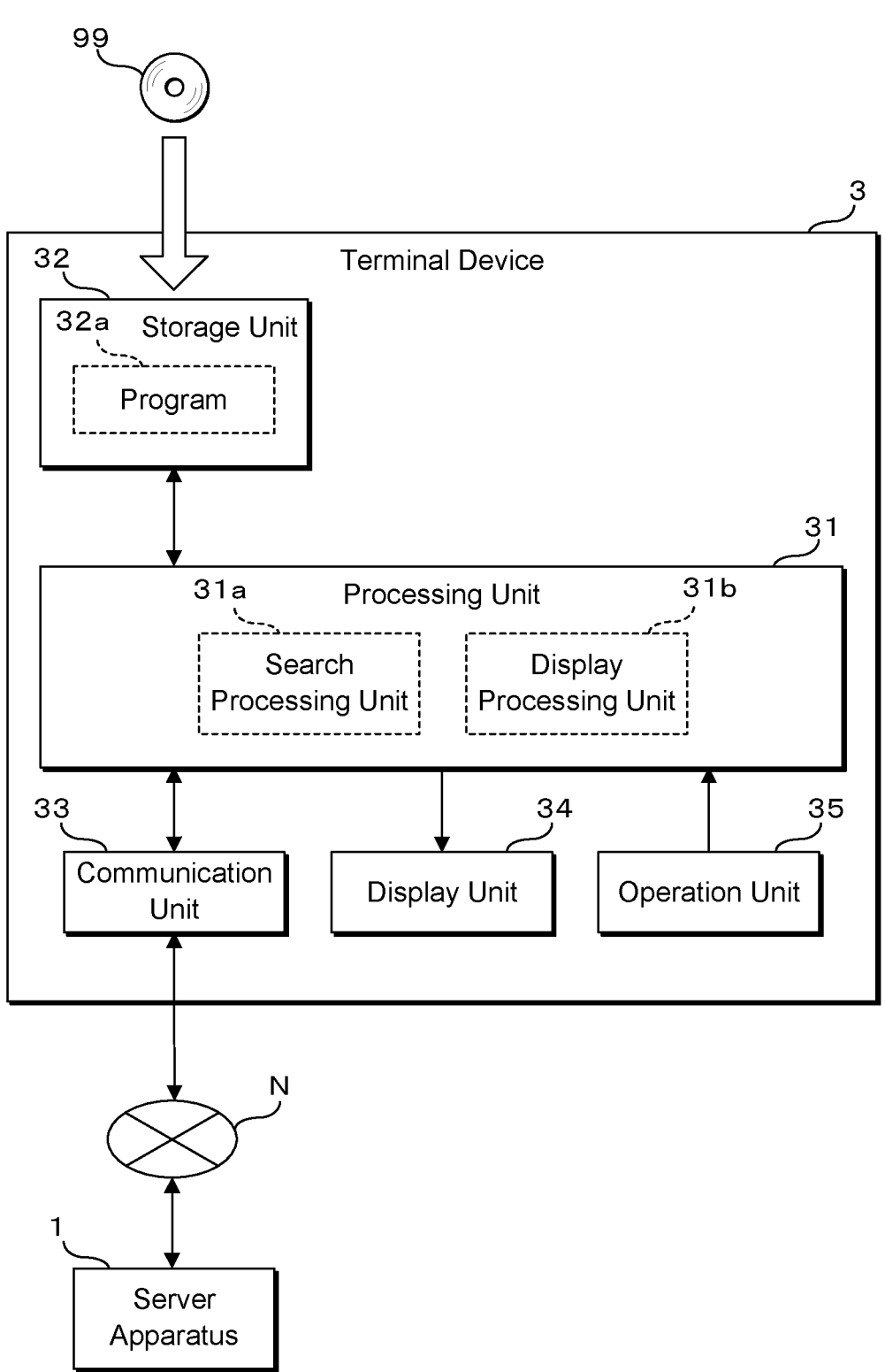
FIG. 3 is a block diagram illustrating a configuration of a terminal device according to the present embodiment.

FIG. 3 is a block diagram illustrating a configuration of the terminal device 3 according to the present embodiment. The terminal device 3 according to the present embodiment includes a processing unit 31, a storage unit (storage) 32, a communication unit (transceiver) 33, a display unit (display) 34, an operation unit 35, and the like. The terminal device 3 is, for example, a device used by a user such as an unskilled worker who learns the technique of installation, repair, or the like for the air conditioner unit 101, and may be configured using, for example, an information processing apparatus such as a smartphone, a tablet terminal device, or a personal computer.

The processing unit 31 is configured using a calculation processing device such as a CPU or an MPU, a ROM, a RAM, and the like. By reading and executing a program 32a stored in the storage unit 32, the processing unit 31 executes processing such as processing of searching for moving images accumulated in the moving image DB 12b of the server apparatus 1 and processing of displaying (playing) these moving images.

The storage unit 32 is configured by using, for example, a nonvolatile memory element such as a flash memory and the like or a storage device such as a hard disk. The storage unit 32 stores various programs to be executed by the processing unit 31 and various types of data necessary for processing by the processing unit 31. In the present embodiment, the storage unit 32 stores the program 32a to be executed by the processing unit 31. In the present embodiment, the program 32a is distributed by a remote server apparatus or the like, and the terminal device 3 acquires the program 32a through communication and stores the program 32a in the storage unit 32. However, the program 32a may be written in the storage unit 32 at the manufacturing stage of the terminal device 3, for example. For example, the terminal device 3 may read the program 32a recorded in a recording medium 98 such as a memory card or an optical disc and store the program 32a in the storage unit 32. For example, a writing device may read the program 32a recorded in the recording medium 98, and write the program in the storage unit 32 of the terminal device 3. The program 32a may be provided in a form of distribution via a network, or may be provided in a form recorded in the recording medium 98.

The communication unit 33 communicates with various devices via the network N including a mobile phone communication network, a wireless LAN, the Internet, and the like. In the present embodiment, the communication unit 33 communicates with the server apparatus 1 via the network N. The communication unit 33 transmits data provided from the processing unit 31 to another device, and provides data received from another device to the processing unit 31.

The display unit 34 is configured using a liquid crystal display or the like, and displays various images, characters, and the like based on the processing executed by the processing unit 31. The operation unit 35 receives a user's operation and notifies the processing unit 31 of the received operation. For example, the operation unit 35 receives a user operation through an input device such as a mechanical button or a touch panel provided on the surface of the display unit 34. Further, for example, the operation unit 35 may be input devices such as a mouse and a keyboard, and these input devices may be configured to be detachable from the terminal device 3.

In addition, in the terminal device 3 according to the present embodiment, the processing unit 31 reads and executes the program 32a stored in the storage unit 32, to realize a search processing unit 31a, a display processing unit 31b, and the like as software functional parts in the processing unit 31. The program 32a may be a program dedicated to the information processing system according to the present embodiment, or may be a general-purpose program such as an Internet browser or a web browser.

The search processing unit 31a executes search processing on a large number of moving images stored in the moving image DB 12*b* of the server apparatus 1. The search processing unit 31*a* receives an input of various search conditions from the user and transmits the received search conditions to the server apparatus 1. The server apparatus 1 that has received the search condition from the terminal device 3 extracts a moving image satisfying the search condition from the moving image DB 12*b* and transmits list information of the extracted moving image and the like to the terminal device 3 as a search result. The terminal device 3 receives and displays the search result from the server apparatus 1, and the search processing unit 31*a* receives the selection of the moving image to be played from the user based on the search result, and requests the server apparatus 1 to transmit the selected moving image.

Figure 4:
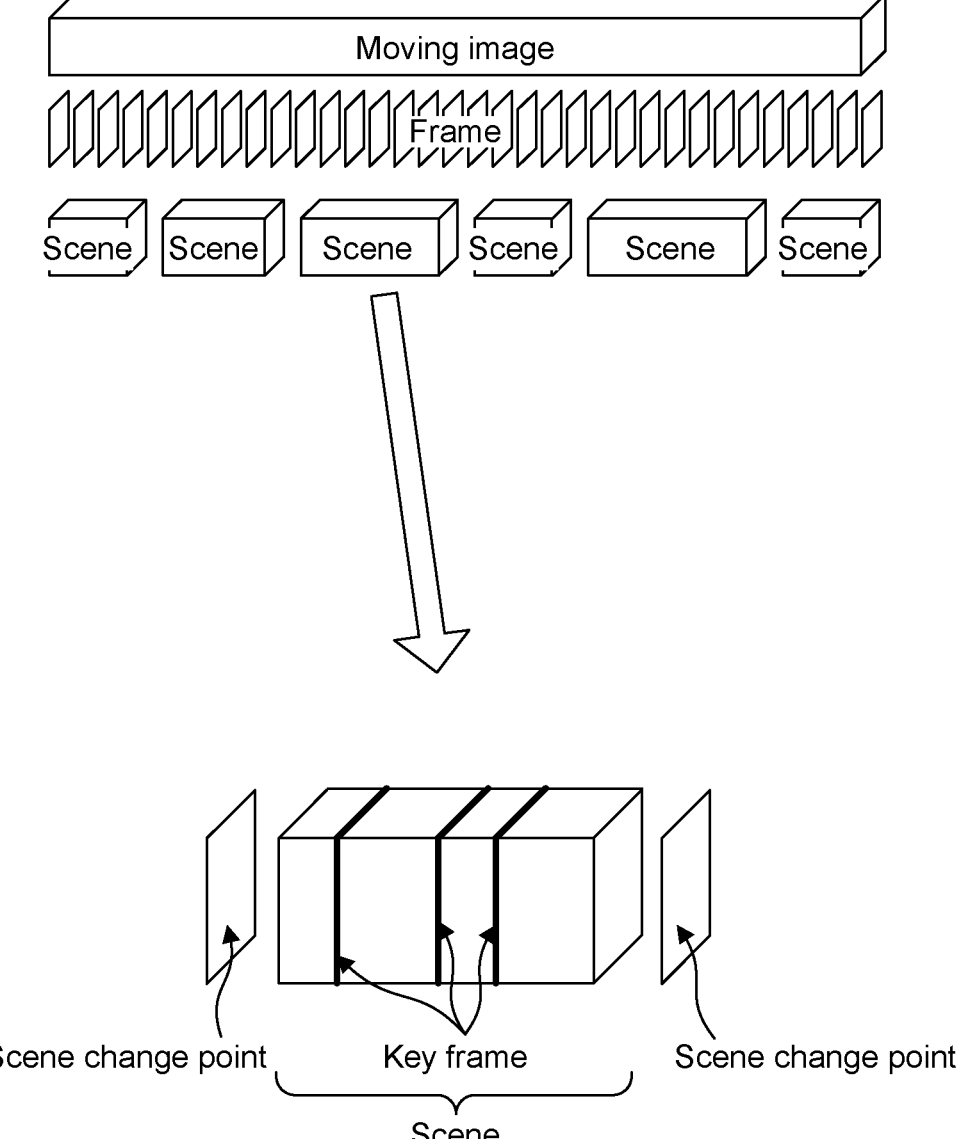
FIG. 4 is a schematic view for explaining detection processing for a scene change point and a key frame, executed by the information processing system according to the present embodiment.

The display processing unit 31*b* executes display processing such as displaying a screen for receiving an input of search conditions, displaying information transmitted as a search result from the server apparatus 1, and playing (displaying) a moving image. In response to the transmission request for the moving image from the search processing unit 31*a*, the server apparatus 1 reads the requested moving image from the moving image DB 12*b*, and transmits the moving image to the terminal device 3 that has transmitted the request, together with various types of information (for example, information on the scene change point and the key frame) on the moving image. The display processing unit 31*b* of the terminal device 3 that has received the moving image from the server apparatus 1 plays the received moving image and displays the moving image on the display unit 34. Furthermore, the display processing unit 31*b* may receive the information transmitted together with the moving image, and may execute processing of, for example, skipping the played point of the moving image to the scene change point or the key frame designated by the user based on the information on the scene change point and the key frame included in the received information. Detection processing for scene change point and key frame FIG. 4 is a schematic view for explaining detection processing for a scene change point and a key frame, executed by the information processing system according to the present embodiment. The moving image handled by the information processing system according to the present embodiment is, for example, a series of several tens of frames (still images) per second, as illustrated in the upper part of FIG. 4. The moving image may be divided into a plurality of scenes. In the present embodiment, a scene may be referred to as a shot or the like in video production, for example, and is a unit for sectionalizing a motion of a person, an object, or the like captured in a moving image. In the present embodiment, one scene is a sequence of a plurality of frames including at least one key frame, as illustrated in the lower part of FIG. 4, and the first frame and the last frame are used as scene change points.

The server apparatus 1 of the information processing system according to the present embodiment acquires a moving image of work such as installation or repair of the air conditioner unit 101 captured by the camera 103 through communication, from a recording medium, or the like and stores the acquired moving image in the moving image DB 12*b*. In this process, the server apparatus 1 executes processing of detecting a scene change point and a key frame in the acquired moving image, and stores information on the detected scene change point and key frame in the moving image DB 12*b* in association with the moving image.

(1) Detection of Scene-Change-Point Candidate

On the moving image acquired from the camera 103, the server apparatus 1 first executes processing of detecting a scene-change-point candidate included in the moving image. The server apparatus 1 according to the present embodiment calculates, for a plurality of frames forming a moving image, a value indicating a difference between two frames consecutive in time series, and determines whether or not the calculated value exceeds a predetermined threshold. When the value indicating the difference between the frames exceeds the threshold, the server apparatus 1 sets the points of the two consecutive frames as the scene-change-point candidates. In the present embodiment, the server apparatus 1 calculates two values, i.e., the Bhattacharyya distance between the HSL histograms and the hash value distance, as the value indicating the difference between the frames.

Figure 5:
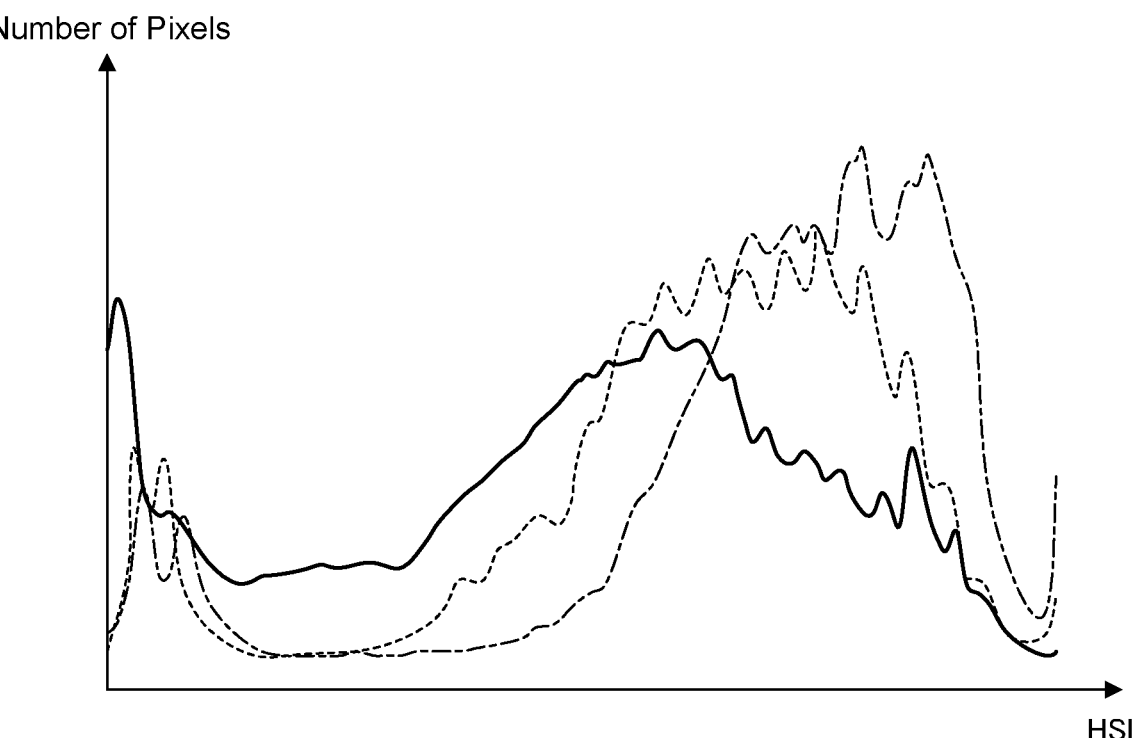
FIG. 5 is a schematic view illustrating an example of an HSL histogram.

FIG. 5 is a schematic view illustrating an example of the HSL histogram, and is a graph illustrating the distribution of the number of pixels with respect to the values of H (hue), S (saturation), and L (luminance) for one frame serving as a sample. In the graph of FIG. 5, the horizontal axis represents the HSL value, and the vertical axis represents the number of pixels. In the graph of FIG. 5, the distribution of H is indicated by a solid line, the distribution of S is indicated by a broken line, and the distribution of L is indicated by a one dot chain line. The server apparatus 1 calculates the HSL histogram for each frame forming a moving image. The server apparatus 1 can calculate the HSL histogram, for example, by converting a pixel value of a frame given as an RGB value into an HSL value and counting the number of pixels included in the frame for each HSL value.

The server apparatus 1 calculates the HSL histogram for all the frames included in the moving image, and calculates a value indicating the difference in the HSL histogram between each frame and the previous frame that is consecutive in time series. In the present embodiment, the server apparatus 1 calculates the Bhattacharyya distance as the value indicating the difference in the HSL histogram. Since a method of calculating the Bhattacharyya distance is an existing technique, a detailed description thereof will be omitted. In addition, in the present embodiment, the server apparatus 1 calculates the HSL histogram of each frame and calculates the Bhattacharyya distance between the frames, but the present invention is not limited thereto, and the server apparatus 1 may calculate a statistical value other than the HSL histogram and may calculate a value other than the Bhattacharyya distance as a value indicating the difference between the frames.

The server apparatus 1 calculates a hash value, for example, pHash for all the frames included in the moving image. Here, pHash is obtained by frequency-converting an image by discrete cosine transform or the like, extracting a low-frequency component, and calculating a hash value. Furthermore, the server apparatus 1 calculates a pHash Hamming distance between each frame and the previous frame that is consecutive in time series as a value indicating the difference between the frames. According to the property of pHash, the more similar two images are, the smaller the pHash Hamming distance of the two images is. Note that methods of calculating pHash and the Hamming distance are existing techniques, and thus detailed description thereof will be omitted. In addition, in the present embodiment, the server apparatus 1 calculates the pHash for each frame and calculates the pHash Hamming distance between the frames, but the present invention is not limited thereto, and the server apparatus 1 may calculate a hash value (such as Average Hash (aHash) for example) other than the pHash, and may calculate a value other than the Hamming distance as a value indicating the difference between the frames.

As described above, the server apparatus 1 according to the present embodiment calculates two values that are the HSL histogram Bhattacharyya distance and the pHash Hamming distance between each frame and the previous frame consecutive in time series as the value indicating the difference between the two frames. In the present embodiment, an average value (weighted average value) of two values of the Bhattacharyya distance and the Hamming distance calculated by the server apparatus 1 is calculated, and the calculated average value is used as the degree of difference between frames.

Figure 6:
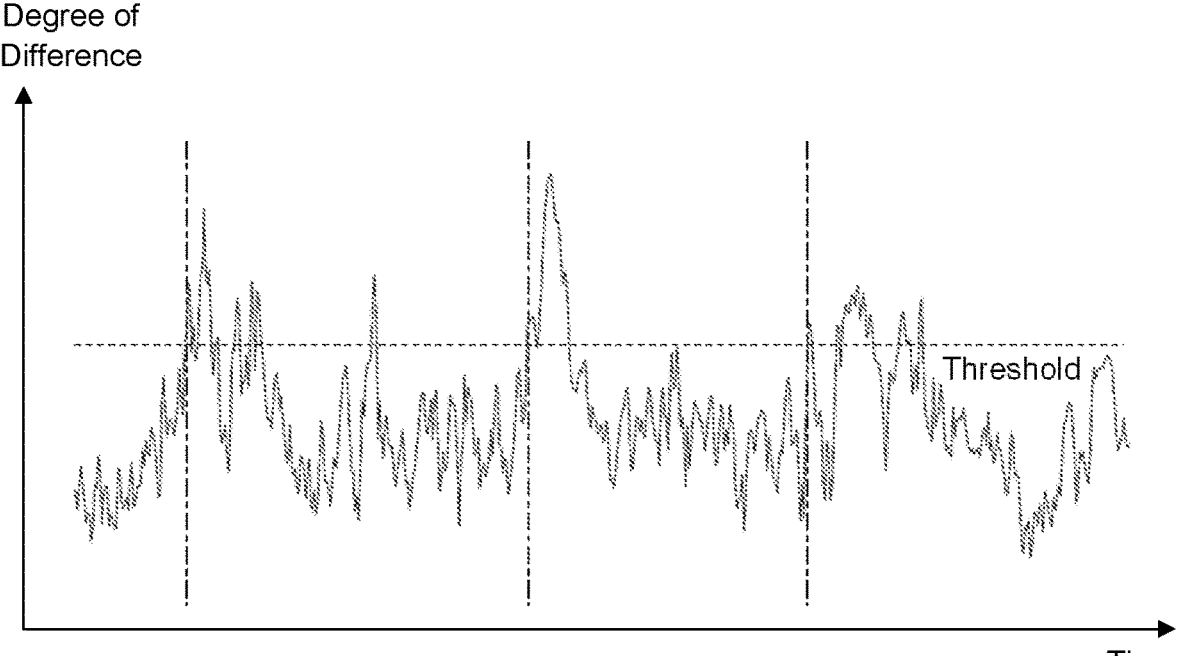
FIG. 6 is a schematic view illustrating an example of a result of calculating a degree of difference between frames in a moving image.

FIG. 6 is a schematic view illustrating an example of a result of calculating the degree of difference between the frames in the moving image, and is a graph illustrating a change in the degree of difference during the running time of the moving image. In the graph of FIG. 6, the horizontal axis represents time (running time of a moving image), and the vertical axis represents the degree of difference between frames. The server apparatus 1 calculates the degree of difference between each of all the frames included in the moving image and the immediately preceding frame, and determines whether the degree of difference exceeds a predetermined threshold. In FIG. 6, a waveform indicated by a solid line indicates a change in the degree of difference, and a horizontal line indicated by a broken line indicates the threshold.

The server apparatus 1 sets a time point at which the calculated degree of difference exceeds the predetermined threshold as a scene-change-point candidate. In FIG. 6, a vertical line that is a one dot chain line indicates a time point set by the server apparatus 1 to be a scene-change-point candidate. While FIG. 6 illustrates three time points as scene-change-point candidates, there are other time points at which the degree of difference exceeds the threshold. This is because, in the present embodiment, the server apparatus 1 is limited so as not to detect a scene-change-point candidate of a predetermined time period after detecting the time point as the scene-change-point candidate. By providing such a limitation, it can be expected that a large number of similar scene-change-point candidates can be prevented from being detected.

(2) Candidate Frame Detection

The server apparatus 1 executes processing of detecting a candidate frame as a candidate of a key frame, from all frames included in a moving image captured by the camera 103. The candidate frame detection processing may be execute before, after, or concurrently with the scene change point detection processing described above. The server apparatus 1 according to the present embodiment executes image processing for extracting edges for a plurality of frames forming a moving image.

Figure 7:
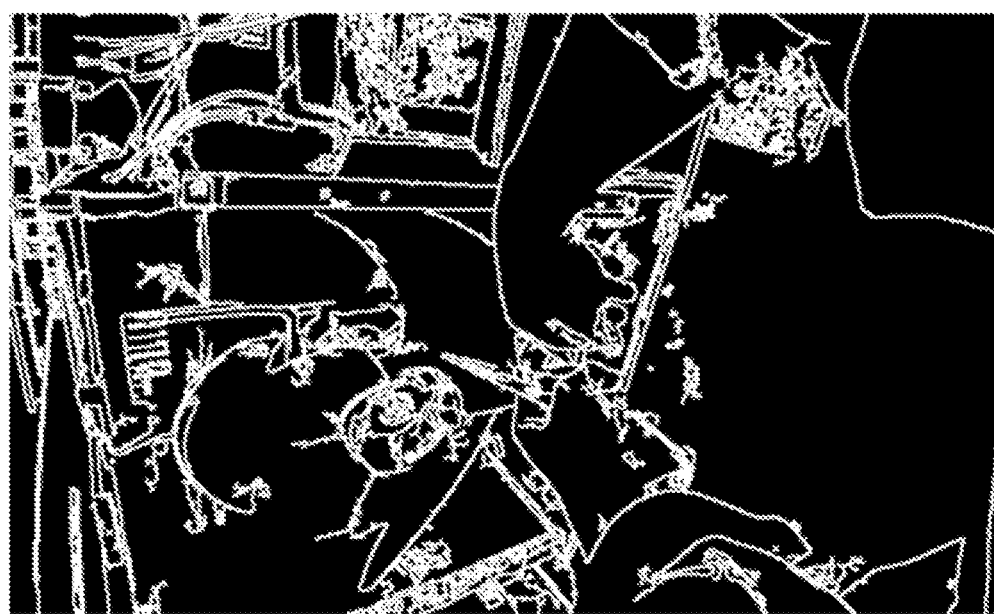
FIG. 7 is a schematic view illustrating an example of edge extraction.
Figure 7:
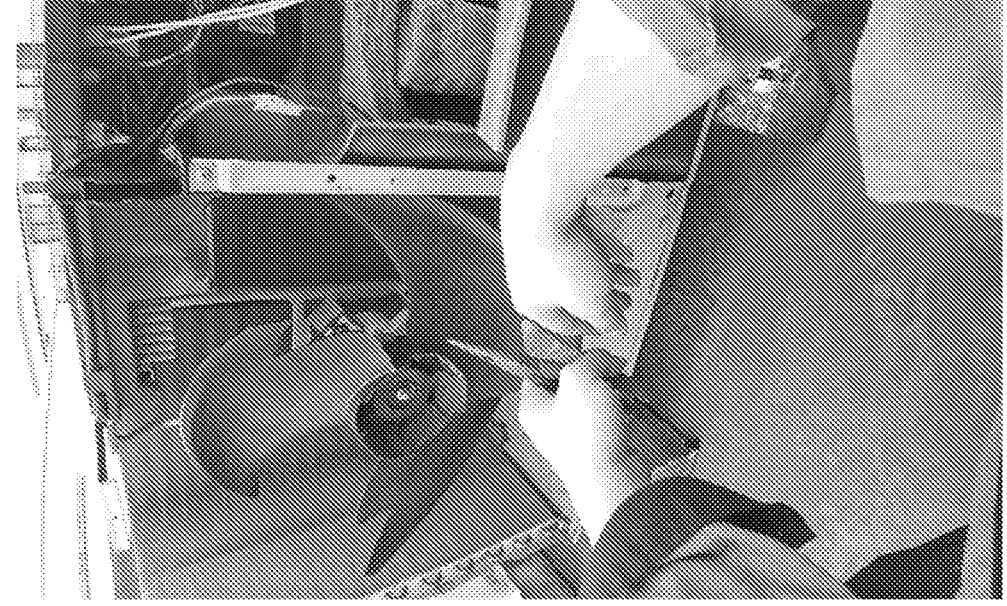

FIG. 7 is a schematic view illustrating an example of the edge extraction. An example of an image (frame image) corresponding to one frame included in the moving image is illustrated on the left side of FIG. 7. On the right side of FIG. 7, for the edge extracted from the image of this frame, a binary image (edge image) in which pixels corresponding to the edge are white and pixels other than the edge are black is illustrated. The server apparatus 1 can extract an edge from an image of each frame by executing, for example, edge detection processing based on Canny method (Canny Edge Detection) on each frame included in the moving image. Since the image processing for extracting an edge from an image is an existing technique, a detailed description thereof will be omitted. The extraction of the edge from the frame image by the server apparatus 1 may be performed by any image processing.

The server apparatus 1 which has extracted the edge of each frame included in the moving image calculates an edge change rate by comparing the edges of two frames that are consecutive in time series. The server apparatus 1 can compare two edge images extracted from two frame images, calculate, for example, the total number of edge pixels changed to non-edge pixels and the total number of non-edge pixels changed to edge pixels, calculate the ratio of the total numbers to the total number of pixels of one frame, and set the calculated ratio as the edge change rate. Note that the edge change rate may be any value as long as it is an index indicating how much the edge changes between frames. Thus, the calculation method of the edge change rate described above is merely an example and is not limited thereto. The server apparatus 1 may calculate the edge change rate by any method.

Figure 8:
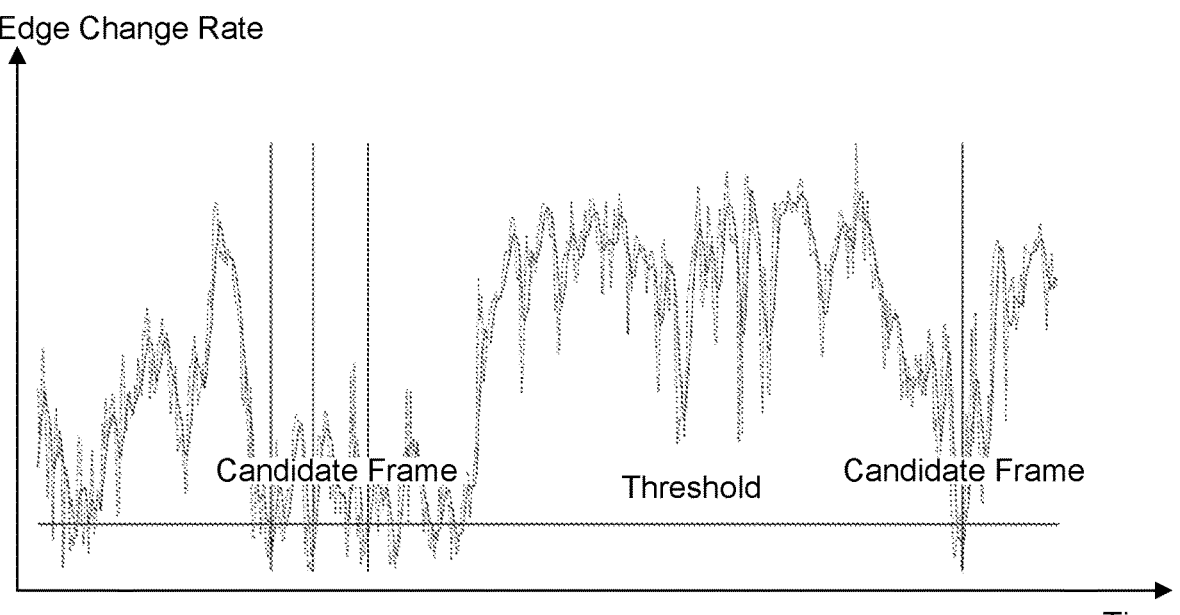
FIG. 8 is a schematic view illustrating an example of a result of calculating an edge change rate between frames in a moving image.

FIG. 8 is a schematic view illustrating an example of the calculation result of the edge change rate between the frames in the moving image, and is a graph illustrating a change in the edge change rate during the running time of the moving image. In the graph of FIG. 8, the horizontal axis represents time (running time of a moving image), and the vertical axis represents an edge change rate between frames. The server apparatus 1 calculates the edge change rate by comparing each of all the frames included in a moving image with an immediately preceding frame, and determines whether or not the edge change rate exceeds a predetermined threshold. In FIG. 8, a horizontal straight line indicates the threshold.

The server apparatus 1 sets a frame at a time point at which the calculated edge change rate falls below the predetermined threshold (a time point at which the edge change rate is lower than the threshold) as a candidate frame to be a candidate of the key frame. In FIG. 8, a straight line in the vertical direction indicates a time point of a frame determined to be the candidate frame by the server apparatus 1. FIG. 8 illustrates a case where three candidate frames are detected in the first half of the moving image, and one candidate frame is detected in the second half of the moving image. In FIG. 8, in addition to these four candidate frames, there are time points at which the edge change rate falls below the threshold, and the server apparatus 1 may also detect candidate frames for these time points.

(3) Determination of Key Frame

For example, when the candidate frames detected from all the frames included in the moving image include a plurality of candidate frames within a predetermined time, the server apparatus 1 executes processing of determining a final key frame by excluding similar candidate frames from such plurality of candidate frames. While the server apparatus 1 executes the processing of determining the key frame after the processing of detecting the candidate frames, the processing of determining the key frame may be performed before, after, or concurrently with the processing of detecting the scene-change-point candidates.

Figure 9:
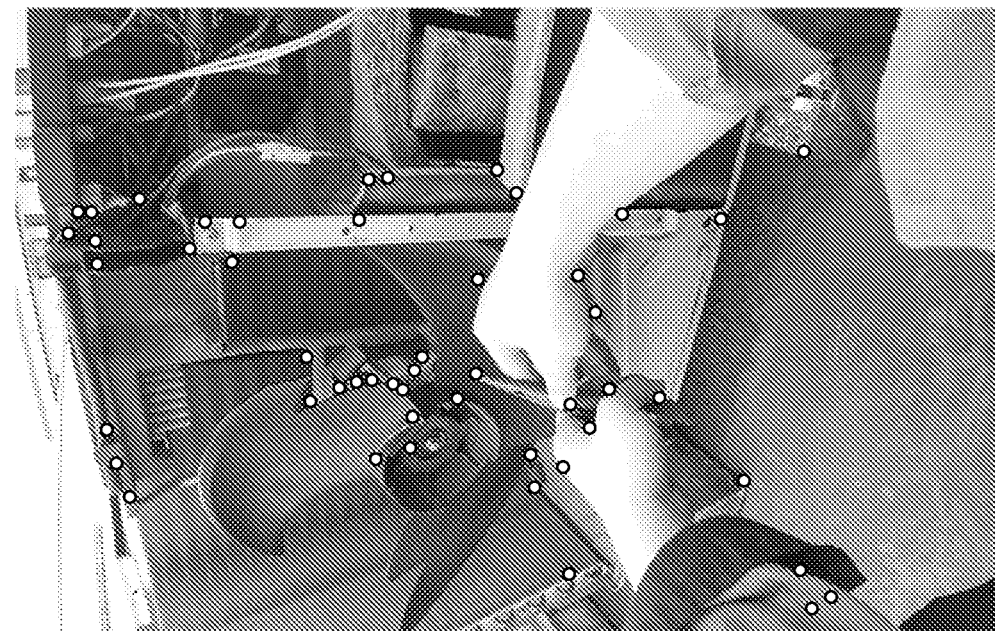
FIG. 9 is a schematic view illustrating an example of a key point extracted from a candidate frame.
Figure 9:
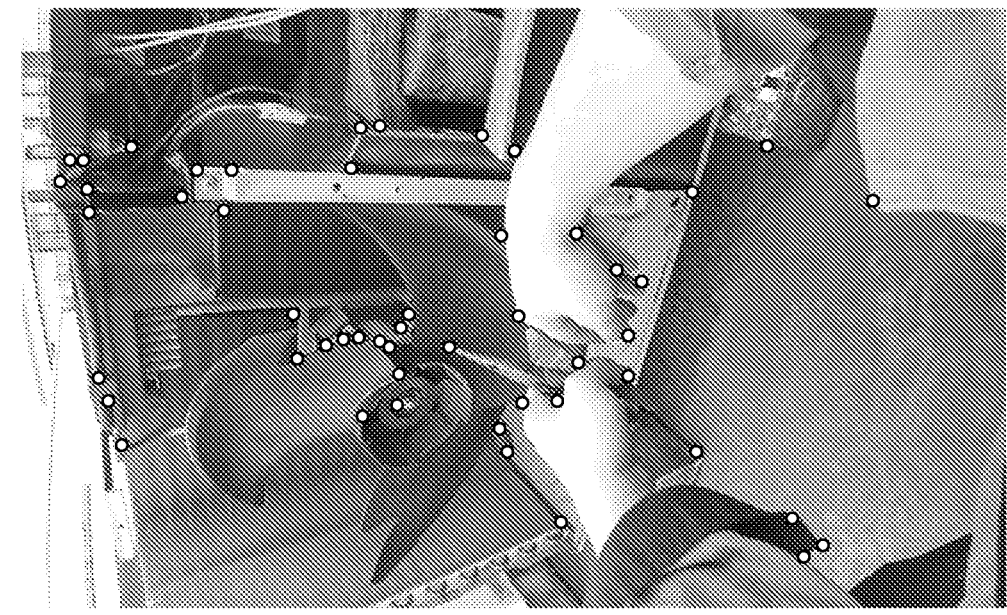

The server apparatus 1 according to the present embodiment executes, for example, processing of extracting a feature amount of each candidate frame, calculates a degree of similarity by comparing feature amounts of two candidate frames, and determines that the two candidate frames are similar when the calculated degree of similarity exceeds a threshold. In the present embodiment, the server apparatus 1 extracts a key point based on the ORB as the feature amount of each candidate frame. The ORB is a method of combining detection of a key point by Features from Accelerated Segment Test (FAST) and a feature amount descriptor by Binary Robust Independent Elementary Features (BRIEF). Since these techniques such as ORB, FAST, and BRIEF are existing techniques, detailed description thereof will be omitted. Note that the extraction of the key points by the server apparatus 1 may be performed by a method other than the ORB, such as scale invariant feature transform (SIFT) or speeded up robust features (SURF), for example. The server apparatus 1 may extract a feature amount other than the key point from the frame. FIG. 9 is a schematic view illustrating an example of key points extracted from a candidate frame. Two images illustrated in FIG. 9 are obtained by extracting key points from two similar candidate frames (candidate frame 1 and candidate frame 2), and the extracted key points are indicated by circular dots on the images.

Figure 10:
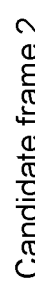
FIG. 10 is a schematic view illustrating an example of a result of key point matching.
Figure 10:
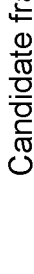
Figure 10:
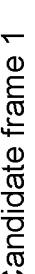

Next, the server apparatus 1 executes processing of comparing the key points extracted from the two candidate frames and searching for a matching key point, that is, so-called key point matching processing. Since the matching processing for the key points extracted by the method such as the ORB is an existing technique, a detailed description thereof will be omitted in the present embodiment. FIG. 10 is a schematic view illustrating an example of a matching result of key points. In the example illustrated in FIG. 10, the matching result of the key points is presented with the corresponding (matching) key points of the two candidate frames illustrated in FIG. 9 connected with a straight line.

For example, the server apparatus 1 counts the total number of key points extracted from the two candidate frames and the number of matches of key points between the two candidate frames, and calculates the ratio of the number of matches to the total number of key points as the degree of similarity. The server apparatus 1 determines whether or not the calculated degree of similarity exceeds a predetermined threshold, and can determine that the two candidate frames are similar to each other when the degree of similarity exceeds the threshold.

The server apparatus 1 determines a candidate frame similar to none of the other candidate frame as the key frame included in the moving image. In addition, when a plurality of similar candidate frames are included in the moving image, the server apparatus 1 appropriately selects one candidate frame from the plurality of candidate frames, determines the selected candidate frame as the key frame, and excludes one or a plurality of the unselected candidate frames from the candidates of the key frame. In this process, when there are two similar candidate frames, the server apparatus 1 sets, for example, a candidate frame earlier in time series as a key frame, and excludes a candidate frame later in time series from candidates of the key frame. In addition, when there are three similar candidate frames, for example, the server apparatus 1 sets the second candidate frame in time series as the key frame and excludes the first and third candidate frames from the candidates of the key frame. The method of selecting one candidate frame as a key frame from a plurality of similar candidate frames is not limited to the above-described method, and the server apparatus 1 may select one key frame from a plurality of similar candidate frames using any method.

(4) Determination of Scene Change Point

After detecting the scene-change-point candidates in the moving image and detecting the key frame, the server apparatus 1 executes processing of determining the scene change point from the scene-change-point candidates. In the present embodiment, the server apparatus 1 determines a scene included in a moving image by determining a final scene change point from the scene-change-point candidates based on a time-series order relationship between the scene-change-point candidates and the key frame. In the present embodiment, the scene of the moving image is determined under a condition that at least one key frame is included as illustrated in the lower part of FIG. 4.

Figure 11:
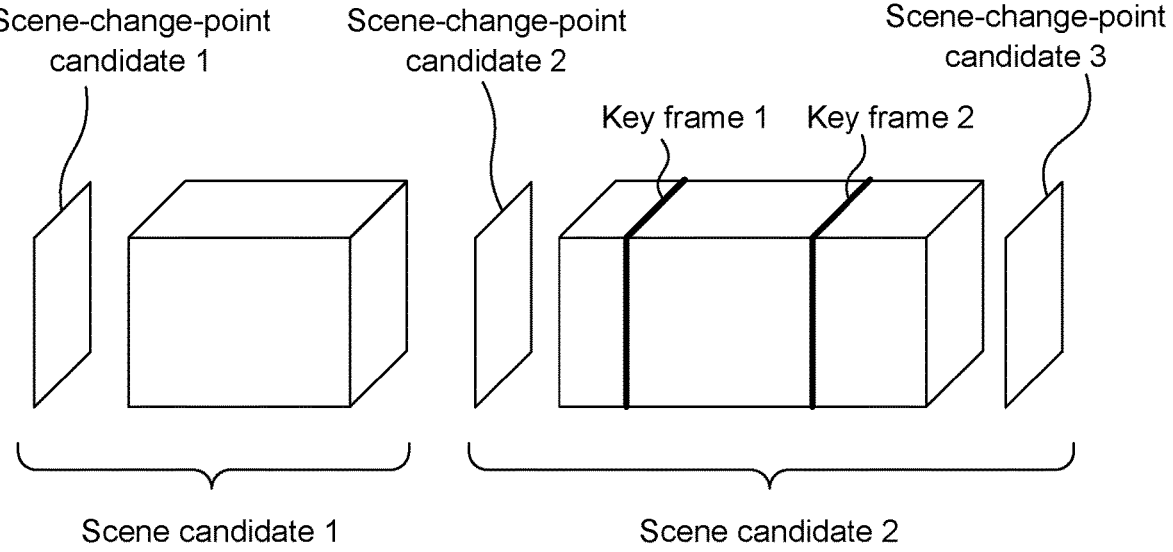
FIG. 11 is a schematic view for explaining a method of determining a scene change point by the server apparatus.

FIG. 11 is a schematic view for explaining a method of determining a scene change point by the server apparatus 1. The illustrated example illustrates a state in which three scene-change-point candidates 1 to 3 and two key frames 1 and 2 are detected by the server apparatus 1 through the above-described processing executed on the moving image. The scene-change-point candidate 1, the scene-change-point candidate 2, and the scene-change-point candidate 3 are in this order in time series, and the key frame 1 and the key frame 2 exist in this order in time series between the scene-change-point candidates 2 and 3. There is no key frame between the scene-change-point candidates 1 and 2. A moving image including a plurality of frames existing between the scene-change-point candidates 1 and 2 is defined as a scene candidate 1, and a moving image including a plurality of frames (including two key frames 1 and 2) existing between the scene-change-point candidates 2 and 3 is defined as a scene candidate 2.

In the present embodiment, a moving image includes one or a plurality of scenes, and one scene includes one or a plurality of key frames. The scene candidate 1 with the scene-change-point candidates 1 and 2 illustrated in FIG. 11 being the preceding and following scene change points does not include a key frame, and is not the scene in the present embodiment. When no key frame is included between two scene-change-point candidates that are consecutive in time series, the server apparatus 1 excludes one of the two scene-change-point candidates to connect a scene candidate that does not include a key frame to a scene candidate that includes a key frame. In the case of the example illustrated in FIG. 11, for example, by excluding the scene-change-point candidate 2, the server apparatus 1 connects the scene candidates 1 and 2 existing before and after the scene-change-point candidate 2 into one scene, and determines the scene-change-point candidates 1 and 3 as the final scene change points.

In the above-described example, the server apparatus 1 excludes the scene-change-point candidate 2 which is later in time series than the scene candidate 1 which does not include the key frame, and connects the scene candidate 1 to the scene candidate 2 which is later in time series, but the present invention is not limited thereto. For example, the server apparatus 1 may exclude the scene-change-point candidate 1 earlier in time series and connect the scene candidate 1 to an earlier scene candidate. The server apparatus 1 may exclude a scene-change-point candidate earlier in time series or may exclude a scene-change-point candidate later in time series, than a scene candidate not including a key frame. Which scene-change-point candidate is to be excluded by the server apparatus 1 may be determined in advance, for example, or may be selected in accordance with the running time of the preceding and following scene candidates, the number of key frames, or the like, for example.

Further, when there is a scene-change-point candidate between two key frames that are consecutive in time series and similar to each other, the server apparatus 1 may exclude this scene-change-point candidate. The server apparatus 1 can determine whether or not two key frames are similar to each other using the degree of similarity calculated when the key frame is determined from the candidate frames. The server apparatus 1 calculates the degree of similarity based on the matching result of the key points for two key frames that are consecutive in time series, and determines that the two key frames are similar when the calculated degree of similarity exceeds a predetermined threshold (which is a value lower than the threshold for determining whether or not the candidate frames are similar). The server apparatus 1 can exclude a scene-change-point candidate existing between two similar key frames, and connect scene candidates before and after the scene-change-point candidate to form one scene.

When there is no key frame between the two scene change points, the server apparatus 1 may exclude the scene between the two scene change points from the entire moving image. In the example illustrated in FIG. 11, when there is no key frame between the scene-change-point candidates 1 and 2, the server apparatus 1 may exclude the scene candidate 1 between the scene-change-point candidates 1 and 2 from the moving image under an assumption that the moving image therebetween does not include important information. In this case, the server apparatus 1 may exclude one of the scene-change-point candidates 1 and 2 together with the scene candidate 1.

After determining all the scene change points and the key frames included in the moving image, the server apparatus 1 stores information on the determined scene change points and the key frames in the moving image DB 12b in association with the moving image. In addition, when a transmission request for a moving image stored in the moving image DB 12b is issued from the terminal device 3, the server apparatus 1 reads the requested moving image and information on the scene change point and the key frame associated with the moving image from the moving image DB 12b, and transmits the requested moving image and the information to the terminal device 3 that has transmitted the request. The terminal device 3 can receive, for example, a scene selection from the user by using the information on the scene change point and the key frame received from the server apparatus 1 together with the moving image, and play and display the moving image from the received scene.

Figure 12:
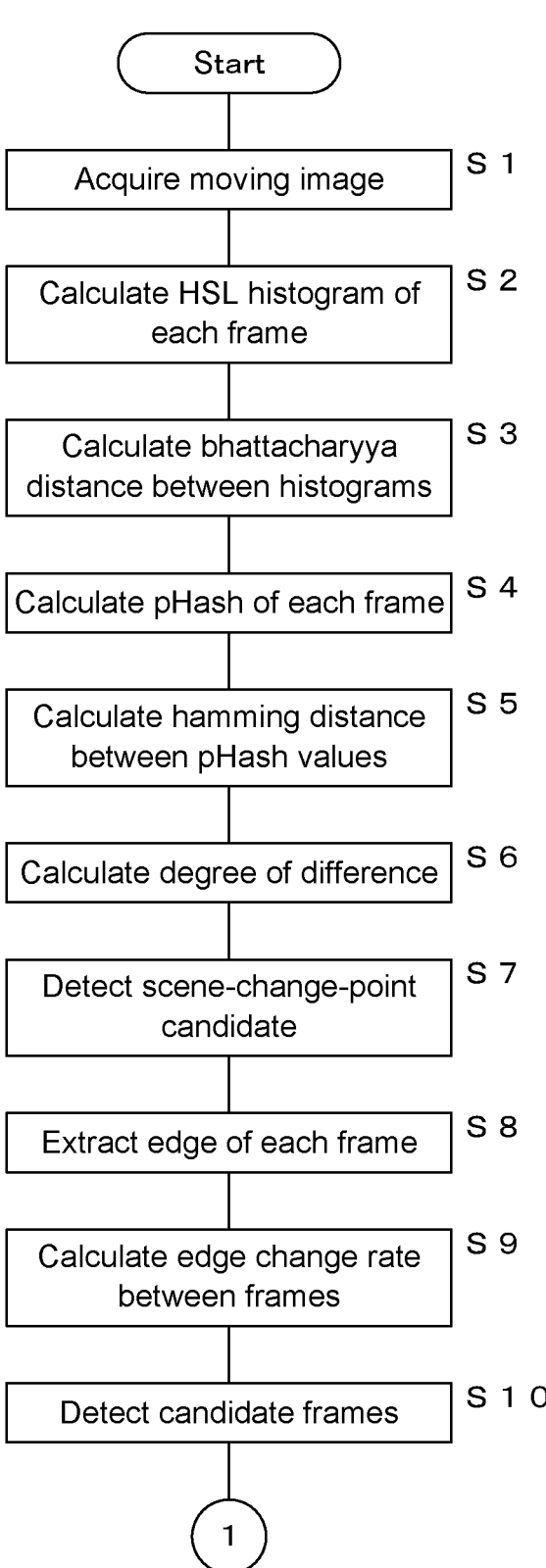
FIG. 12 is a flowchart illustrating a procedure of processing executed by the server apparatus in the present embodiment.
Figure 13:
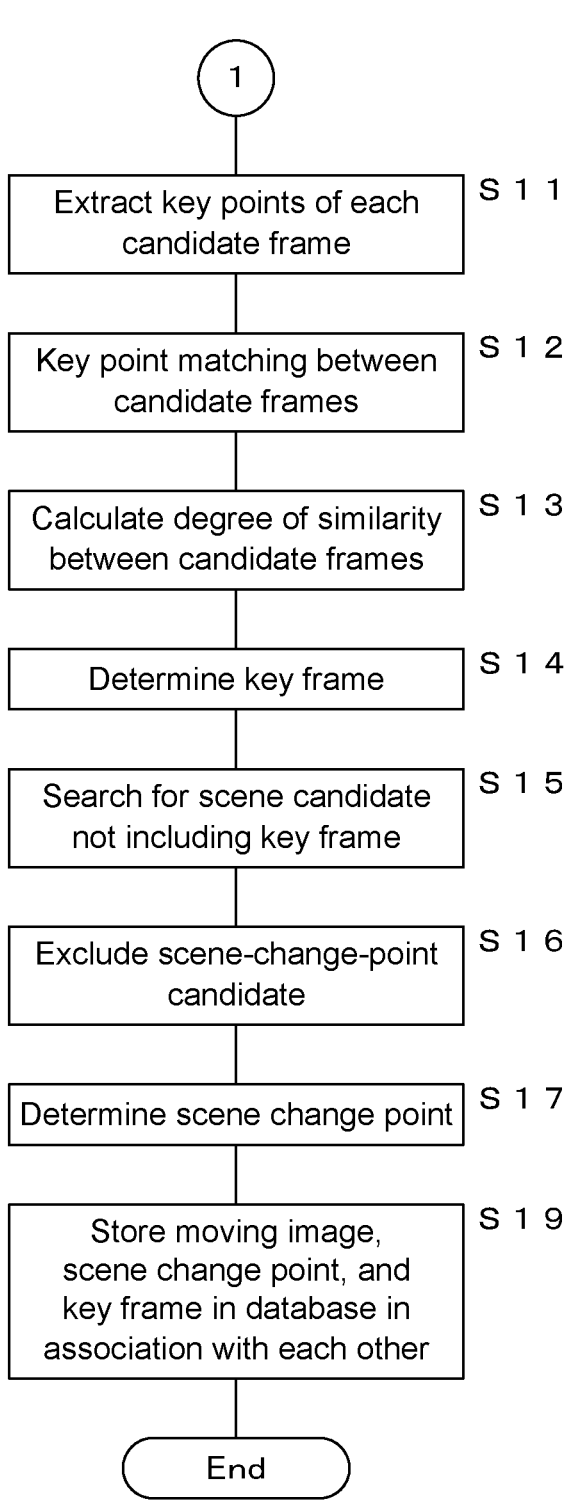
FIG. 13 is a flowchart illustrating a procedure of processing executed by the server apparatus in the present embodiment.

FIG. 12 and FIG. 13 are flowcharts illustrating a procedure of processing executed by the server apparatus 1 in the present embodiment. The processing unit 11 of the server apparatus 1 according to the present embodiment communicates with the camera 103 via the communication unit 13, for example, to acquire a moving image of the installation or repair of the air conditioner unit 101 captured by the camera 103 (step S1). The scene-change-point candidate detection unit 11a of the processing unit 11 calculates an HSL histogram of each frame included in the moving image acquired in step S1 (step S2). Based on the HSL histogram of each frame calculated in step S2, the scene-change-point candidate detection unit 11a calculates the Bhattacharyya distance between the HSL histograms of two frames consecutive in time series (step S3).

Next, the scene-change-point candidate detection unit 11a calculates pHash of each frame included in the moving image acquired in step S1 (step S4). Based on the pHash of each frame calculated in step S4, the scene-change-point candidate detection unit 11a calculates the Hamming distance between the pHash values of the two frames that are consecutive in time series (step S5). Based on the Bhattacharyya distance calculated in step S3 and the Hamming distance calculated in step S5, the scene-change-point candidate detection unit 11a calculates the degree of difference between two frames that are consecutive in time series (step S6). As the degree of difference, for example, a total value, an average value, or the like of the Bhattacharyya distance and the Hamming distance may be used. The scene-change-point candidate detection unit 11a compares the degree of difference calculated in step S6 with the predetermined threshold, and detects as the scene-change-point candidates, two frames (or between these two frames) whose degree of difference exceeds the predetermined threshold (step S7).

The candidate-frame detection unit 11b of the processing unit 11 extracts an edge of each frame included in the moving image acquired in step S1 (step S8). Based on the edges extracted in step S8, the candidate-frame detection unit 11b calculates the edge change rate between each frame and the frame immediately preceding this frame in time series (step S9). The candidate-frame detection unit 11b compares the edge change rate calculated in step S9 with the predetermined threshold, and detects a frame with the edge change rate not exceeding the predetermined threshold as a candidate frame as a candidate of the key frame (step S10).

The key frame determination unit 11c of the processing unit 11 extracts the key point based on ORB for each candidate frame detected in step S10 (step S11). The key frame determination unit 11c performs matching of key points between the candidate frames based on the key points of the candidate frames extracted in step S11 (step S12). The key frame determination unit 11c calculates the degree of similarity between the candidate frames based on the result of the key point matching in step S12 (step S13). The key frame determination unit 11c determines a key frame by selecting one frame from a plurality of candidate frames whose degree of similarity exceeding the threshold, as the key frame and excluding the other candidate frames (step S14).

Based on the scene-change-point candidates detected in step S7 and the key frame determined in step S14, the scene-change-point determination unit 11d of the processing unit 11 searches for a scene candidate that does not include the key frame from among scene candidates existing between two scene-change-point candidates that are consecutive in time series (step S15). The scene-change-point determination unit 11d excludes one of the two scene-change-point candidates defining the scene candidate that does not include the key frame found in step S15 (step S16). The scene-change-point determination unit 11d determines the scene-change-point candidate not excluded in step S16, as the final scene change point (step S17). The DB processing unit 11e of the processing unit 11 stores the moving image acquired in step S1, the scene change point determined in step S17, and the information on the key frame determined in step S14 in association with each other in the moving image DB 12b (step S19), and ends the processing.

Moving Image Playing Processing

In the information processing system according to the present embodiment, the server apparatus 1 stores the information on the scene change point and the key frame of the moving image determined by the above-described processing in the moving image DB 12b in association with the moving image. Further, in the moving image DB 12b, for example, various pieces of information provided by a person who captured the moving image such as a character string including a title, an explanation of the moving image, a captured date and time of the moving image, a captured location of the moving image, and the like are stored in association with each other. In the present embodiment, the moving image DB 12*b* stores a moving image obtained by capturing work such as installation or repair of the air conditioner unit 101, and the moving image is stored in association with character information such as the name or the serial number of the air conditioner unit 101 that is the target of the work such as installation or repair.

For example, the terminal device 3 receives an input of a character string serving as a keyword from a user, transmits the received character string to the server apparatus 1, and requests a search for a moving image. In response to the request from the terminal device 3, the server apparatus 1 searches the moving image DB 12*b* for the moving image including the character string of the given keyword in the title, the explanation, the name, the serial number, or the like of the air conditioner unit 101, and transmits information on the corresponding moving image as a search result to the terminal device 3 that has transmitted the request. The terminal device 3 that has received the search result from the server apparatus 1 displays a list of information such as the title and the captured date and time of the moving image corresponding to the input keyword.

device 3 receives, from the user, selection of a moving image to be played from among the moving images displayed in the list as the search result, and requests the server apparatus 1 to transmit the selected moving image. In response to the request from the terminal device 3, the server apparatus 1 reads the selected moving image and the information on the scene change point and the key frame associated with the moving image from the moving image DB 12*b*, and transmits the moving image and the information to the terminal device 3 that has transmitted the request. The terminal device 3 that has received the moving image and the information on the scene change point and the key frame from the server apparatus 1 displays a play screen of the moving image on the display unit 34, and plays and displays the moving image on the screen.

Figure 14:
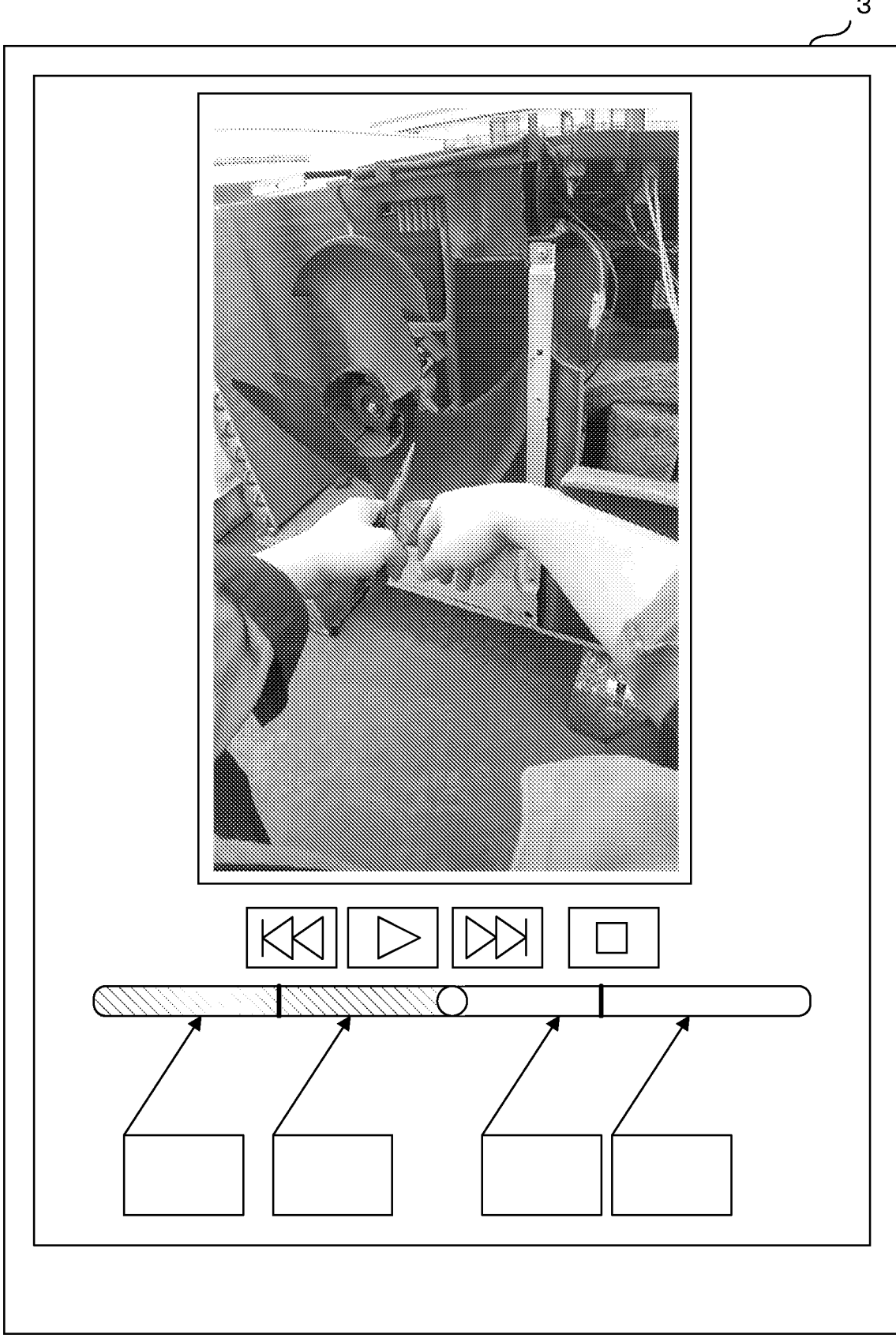
FIG. 14 is a schematic view illustrating an example of a screen for playing by the terminal device.

FIG. 14 is a schematic view illustrating an example of the screen for playing by the terminal device 3. On the play screen illustrated in the figure, a moving image display area for displaying a moving image is provided at the center of the upper side of the screen, and four operation buttons are provided side by side in the horizontal direction below this area. Four operation buttons are a button for returning to the beginning of a scene (return button), a button for playing a moving image (play button), a button for skipping to the next scene (skip button), and a button for stopping playing of the moving image (stop button) arranged in this order from the left side. The terminal device 3 receives a user's operation on these operation buttons and executes processing such as playing and stopping the moving image. Further, the terminal device 3 performs the scene change of the moving image in response to the return button and the skip button based on the scene change point received from the server apparatus 1. For example, when an operation is performed on the return button, the terminal device 3 starts the playing from the closest scene change point before the current playing time point of the moving image. In addition, for example, when an operation is performed on the skip button, the terminal device 3 starts the playing from the closest scene change point after the current playing time point of the moving image.

The terminal device 3 displays a progress bar indicating the running time below the four operation buttons on the playing screen, and provides a break indicating a scene change point of the moving image on the progress bar. In the illustrated example, three scenes are included in the moving image, and two breaks of a thick vertical line indicating the moving image change point are provided on the progress bar. The terminal device 3 displays reduced images of one or a plurality of key frames included in the moving image in an appropriate arrangement below the progress bar. The terminal device 3 provides arrows indicating temporal timings at which these key frames appear in the moving image, arrows connecting the images of the key frames and the progress bar. The arrows indicate time points at which the corresponding key frames appear during the running time of the moving image indicated by the progress bar. In a case where an operation such as a click or a tap on the key frame displayed on the play screen is received, the terminal device 3 plays the moving image from the time point corresponding to the key frame for which the operation is received.

Note that the method of displaying a moving image as illustrated in FIG. 14 is merely an example, and is not limiting. The terminal device 3 may display a moving image using any method.

Summary Moving Image Generation Processing

In the information processing system according to the present embodiment, the server apparatus 1 executes processing of generating a digest moving image (summary moving image) of the moving image based on the scene change point and the key frame of the moving image determined through the above-described processing. The server apparatus 1 extracts (cuts out) one or a plurality of partial moving images from the moving image and connects the partial moving images to generate the digest moving image with a shorter running time than the original moving image.

The server apparatus 1 according to the present embodiment extracts a partial moving image of a predetermined time (for example, several seconds to several tens of seconds) from the scene change point and partial moving images of predetermined times before and after the key frame from the entire moving image. The server apparatus 1 generates the digest moving image by connecting the plurality of partial moving images extracted from the moving image in chronological order. The server apparatus 1 stores the generated digest moving image in the moving image DB 12*b* in association with the original moving image.

The server apparatus 1 may generate the digest moving image, for example, when the moving image is acquired from the camera 103, may generate the digest moving image, for example, in response to a request from the terminal device 3, or may generate the digest moving image at other timings. For example, when transmitting a search result in response to a search request for a moving image from the terminal device 3, the server apparatus 1 may read a digest moving image of the moving image corresponding to the search result from the moving image DB 12*b* and transmit the digest moving image to the terminal device 3. The terminal device 3 may display, as the search result of the moving image, a list of the digest moving images together with information such as titles of the plurality of moving images satisfying the search condition.

Title Generation Processing

Figure 15:
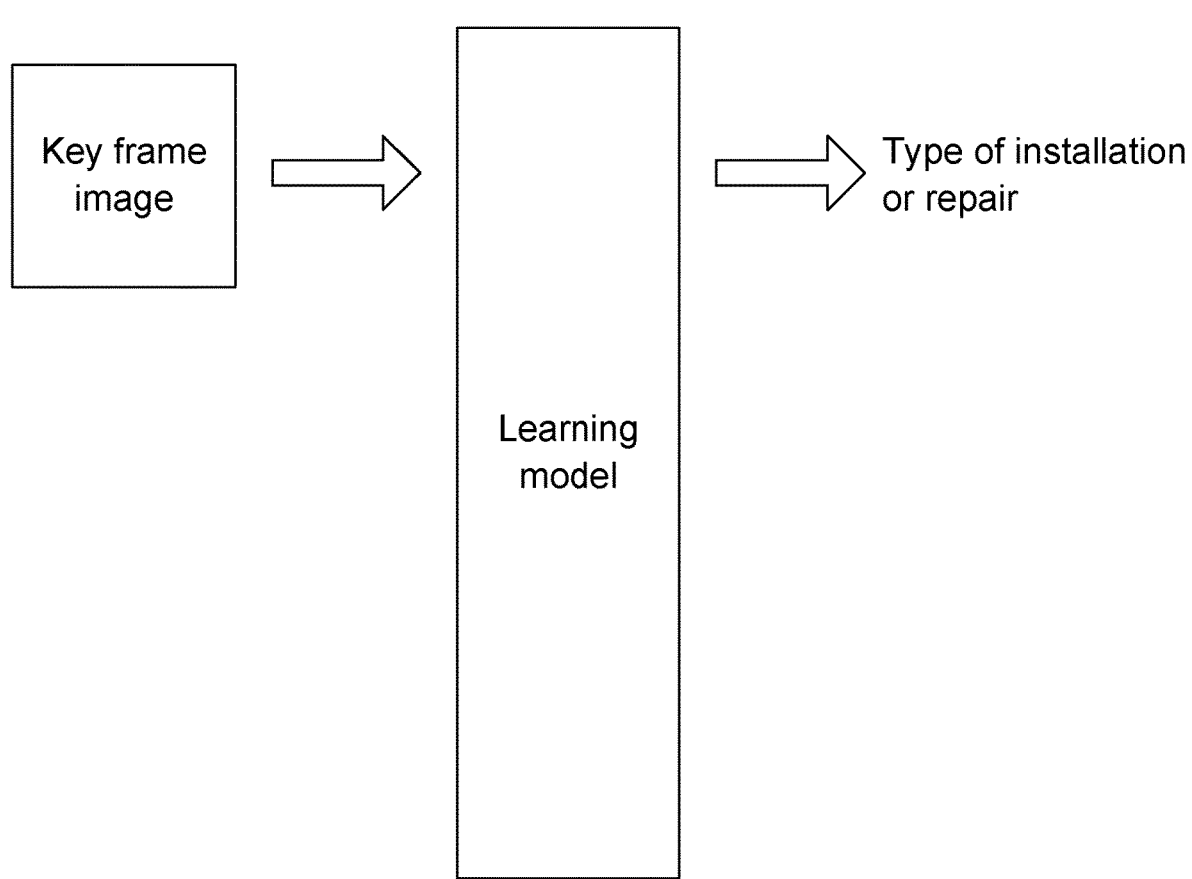
FIG. 15 is a schematic view for explaining a learning model used by the server apparatus according to the present embodiment.

In the information processing system according to the present embodiment, the server apparatus 1 can automatically generate a title of a moving image, a title of a scene included in the moving image, a title of a key frame included in the moving image, or the like by using a learning model subjected to machine learning, so-called artificial intelligence (AI). FIG. 15 is a schematic view for explaining a learning model used by the server apparatus 1 according to the present embodiment. The learning model used by the server apparatus 1 according to the present embodiment is a learning model for which machine learning has been performed in advance so as to receive a key frame included in a moving image as an input and output the type of installation or repair of the air conditioner unit 101 captured in the key frame as a classification result.

As the learning model according to the present embodiment, for example, a learning model having a configuration of a convolutional neural network (CNN), a deep neural network (DNN), or the like may be adopted. The learning model can be generated by performing so-called supervised machine learning using, for example, learning data in which an image is associated with the type of installation or repair captured in the image. As processing of the supervised learning of the learning model, which is an existing technique and thus a detailed description thereof will be omitted, the server apparatus 1 can train the learning model by a method such as a gradient descent method, a stochastic gradient descent method, or a back propagation method for example.

The server apparatus 1 stores the learning model generated by machine learning in the storage unit 12. After detecting a key frame included in a moving image, the server apparatus 1 inputs each of one or a plurality of detected key frames to the learning model and acquires the classification result output by the learning model. The type of installation or repair of the air conditioner unit 101 output by the learning model is, for example, installation of an outdoor unit of an air conditioner, repair of an indoor unit of the air conditioner, or the like. For example, the server apparatus 1 performs classification of the type of installation or repair using the learning model for each key frame included in the moving image, acquires classification results for all the key frames, and generates the title of the moving image and the title of the scene based on the acquired classification results.

The server apparatus 1 appropriately selects one classification result such as, for example, the most frequent classification result from the classification results of the plurality of key frames included in the moving image. The server apparatus 1 can set, for example, a character string such as "XXXX (year), YY (month), ZZ (day): installation of outdoor unit of air conditioner", which is a combination of the selected classified result and the date and time at which the moving image was captured, as title of the moving image. Further, the server apparatus 1 can appropriately select one of the classification results of the key frames included in the scene for each scene included in the moving image, and set a character string such as "repair of indoor unit of air conditioner" corresponding to the selected classification result as the title of the scene. The method of generating a title based on the classification result of the type of installation or repair by the server apparatus 1 is not limited to the above-described method, and any method may be adopted.

Further, the server apparatus 1 may use a learning model that receives an input of a key frame and generates a character string as the title of the key frame, instead of the learning model that classifies the type of installation or repair of the air conditioner unit 101 captured in the key frame. Such a learning model can be configured by combining, for example, a learning model such as a CNN that converts an image into a feature amount and a learning model such as a recurrent neural network (RNN), a long short term memory (LSTM), a bidirectional encoder representations from transformers (BERT), or a generative pre-trained transformer-3 (GPT-3) that generates a title character string based on the feature amount.

The server apparatus 1 stores the title of the moving image and the title of the scene included in the moving image generated based on the key frame, in the moving image DB 12b in association with the moving image. For example, when the person who captured the moving image or the like has input the title of the moving image or the scene, the server apparatus 1 may store the input title in the moving image DB 12b and may not generate the title using the learning model. Further, the terminal device 3 can display the title of the moving image at the upper portion or the like on the playing screen illustrated in FIG. 14, for example, and display the title of the scene in association with the image of one or a plurality of key frames.

Summary

In the information processing system according to the present embodiment configured as described above, the server apparatus 1 detects candidates of a scene change point in a moving image captured by the camera 103, detects candidate frames that can be candidates of a key frame (main frame) of a scene from among a plurality of frames forming the moving image, determines a key frame from among the candidate frames, and determines the scene change point from among the candidates of the scene change point based on the time-series order of the candidates of the scene change point and the key frame Thus, the information processing system according to the present embodiment can be expected to accurately detect a change in a scene in a moving image.

In the information processing system according to the present embodiment, when there is no key frame between two candidates of the scene change point that are consecutive in time series, the server apparatus 1 determines the scene change point by excluding one of the two candidates of the scene change point. Further, in the information processing system according to the present embodiment, when there is a candidate of the scene change point between two key frames that are consecutive in time series and similar to each other, the server apparatus 1 may determine the scene change point by excluding the candidate of the scene change point. As a result, the information processing system according to the present embodiment can be expected to accurately determine a scene change point from among scene-change-point candidates detected in a moving image.

Further, in the information processing system according to the present embodiment, the server apparatus 1 calculates a statistical value (HSL histogram) of each frame included in the moving image, and detects the candidates of the scene change point based on a difference (degree of difference) between the statistical values of two frames that are consecutive in time series. Further, in the information processing system according to the present embodiment, the server apparatus 1 calculates the hash value (pHash) of each frame included in the moving image, and detects the candidates of the scene change point based on the difference in hash value between two frames that are consecutive in time series. Thus, the information processing system according to the present embodiment can be expected to accurately detect a scene-change-point candidate in a moving image.

In addition, in the information processing system according to the present embodiment, the server apparatus 1 extracts an edge from each frame included in the moving image, and detects the candidate frame based on a change (change rate) in the edge between two frames that are consecutive in time series. Further, in the information processing system according to the present embodiment, the server apparatus 1 extracts a feature point (key point) from the candidate frames, and excludes similar candidate frames based on a result of comparison in the feature point between the plurality of candidate frames, to determine the key frame in the candidate frames. Thus, the information processing system according to the present embodiment can be expected to accurately detect candidate frames in a moving image and accurately determine a key frame from among the candidate frames.

Further, in the information processing system according to the present embodiment, the server apparatus 1 stores the determined information on the scene change point and the key frame in the moving image DB 12*b* in association with the moving image. The terminal device 3 receives the selection of the scene change point or the key frame from the user, and plays the moving image based on the scene change point or the key frame received. Thus, the information processing system according to the present embodiment can be expected to play a moving image from a scene or the like the user requires.

Further, in the information processing system according to the present embodiment, the server apparatus 1 stores the information on the scene change point and the key frame determined in the moving image DB 12*b* in association with the title of the moving image, the explanation, the captured date and time, the captured location, and the character information such as the name or the serial number of the air conditioner unit (air-conditioning-related device) 101 to be installed or repaired. Accordingly, the user can search for a moving image by inputting a keyword or the like based on the character information associated with the moving image.

Further, in the information processing system according to the present embodiment, partial moving images are extracted from the moving image based on the scene change point and the key frame determined, and the extracted partial moving images are combined to generate a summary moving image (digest moving image). Thus, the information processing according to the present embodiment can provide the user with the summary moving image, and by using the summary moving image, the user can be expected to easily grasp the overview of the moving image, even if the moving image has a long running time.

Further, in the information processing system according to the present embodiment, the server apparatus 1 inputs the determined key frame to a learning model for which machine learning has been performed in advance, and determines the title of the moving image or the scene included in the moving image based on the information output by the learning model. Thus, the information processing system according to the present embodiment can automatically assign a title to a moving image even when a person who has captured the moving image did not input a title.

It should be understood that the embodiments disclosed herein are illustrative and non-restrictive in every respect. The scope of the present invention is defined by the appended claims rather than by the description preceding them, and is intended to include any modifications within the scope and meaning equivalent to the appended claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. An image processing method comprising, by an image processing apparatus:
   detecting candidates of a scene change point in a moving image;
   detecting candidate frames that are candidates of a main frame of a scene from among frames forming the moving image;
   determining the main frame from among the candidate frames;
   determining, based on a time-series order of the candidates of the scene change point and the main frame,
      when the main frame does not exist between two candidates of the scene change point that are consecutive in time series, the scene change point with one of the two candidates of the scene change point excluded, and
      when a candidate of the scene change point exists between two main frames that are consecutive in time series and are similar to each other, the scene change point with the candidate of the scene change point excluded,
   to determine the scene change point from among the candidates of the scene change point;
   generating a summary moving image based on the determined scene change point; and
   storing the summary moving image.

2. The image processing method according to claim 1, further comprising:
   calculating statistical values of the frames; and
   detecting the candidates of the scene change point based on a difference between the statistical values of two of the frames.

3. The image processing method according to claim 1, further comprising:
   calculating hash values of the frames; and
   detecting the candidates of the scene change point based on a difference between the hash values of two of the frames.

4. The image processing method according to claim 1, further comprising:
   extracting an edge from each frame; and
   detecting the candidate frames based on a change in the edge between two frames.

5. The image processing method according to claim 1, further comprising:
   extracting a feature point from the candidate frames; and
   determining the main frame from the plurality of candidate frames with a candidate frame excluded based on a result of comparison in the feature point between the candidate frames.

6. The image processing method according to claim 1, further comprising:
   storing information on the scene change point and the main frame determined, in association with the moving image;
   receiving selection of the scene change point or the main frame; and
   playing the moving image based on the scene change point or the main frame selected.

7. The image processing method according to claim 6, further comprising:

storing information on the scene change point and the main frame determined, in association with character information on the moving image.

8. The image processing method according to claim 7, further comprising:

acquiring a moving image obtained by capturing work of installing or repairing an air-conditioning-related device;

determining the scene change point and the main frame for the acquired moving image; and storing the information on the scene change point and the main frame determined, in association with character information on the air-conditioning-related device.

9. The image processing method according to claim 1, further comprising:

extracting partial moving images from the moving image based on the scene change point and the main frame determined; and generating a summary moving image by combining the extracted partial moving images.

10. The image processing method according to claim 1, further comprising:

inputting the main frame determined to a learning model configured to classify a type of installation or repair for an input of a main frame of a moving image obtained by capturing work of installing or repairing an air-conditioning-related device;

acquiring a classification result output by the learning model; and determining a title of the moving image or a scene included in the moving image based on the classification result acquired.

11. A non-transitory computer-readable medium storing a computer program thereon, the computer program being configured to execute processing of:

detecting candidates of a scene change point in a moving image;

detecting candidate frames that are candidates of a main frame of a scene from among frames forming the moving image;

determining the main frame from among the candidate frames;

determining, based on a time-series order of the candidates of the scene change point and the main frame, when the main frame does not exist between two candidates of the scene change point that are consecutive in time series, the scene change point with one of the two candidates of the scene change point excluded, and when a candidate of the scene change point exists between two main frames that are consecutive in time series and are similar to each other, the scene change point with the candidate of the scene change point excluded, to determine the scene change point from among the candidates of the scene change point;

generating a summary moving image based on the determined scene change point; and storing the summary moving image.

12. An image processing apparatus comprising:

a processor including a scene-change-point candidate detection unit configured to detect candidates for a scene change point in a moving image;

a candidate-frame detection unit configured to detect candidate frames that are candidates of a main frame of a scene from among frames forming the moving image;

a main frame determination unit configured to determine the main frame from among the candidate frames;

a scene-change-point determination unit configured to determine, based on a time-series order of the candidates of the scene change point and the main frame, when the main frame does not exist between two candidates of the scene change point that are consecutive in time series, the scene change point with one of the two candidates of the scene change point excluded, and when a candidate of the scene change point exists between two main frames that are consecutive in time series and are similar to each other, the scene change point with the candidate of the scene change point excluded, to determine the scene change point from among the candidates of the scene change point; and a database processing unit configured to generate a summary moving image based on the determined scene change point, and to store the summary moving image.

* * * * *